United States Patent
Nakanishi et al.

(10) Patent No.: US 8,375,160 B2
(45) Date of Patent: Feb. 12, 2013

(54) MEMORY CONTROLLER, NONVOLATILE STORAGE MODULE, ACCESS MODULE AND NONVOLATILE STORAGE SYSTEM

(75) Inventors: Masahiro Nakanishi, Kyoto (JP); Tatsuya Adachi, Osaka (JP)

(73) Assignee: Panasonic Corporation, Osaka (JP)

( * ) Notice: Subject to any disclaimer, the term of this patent is extended or adjusted under 35 U.S.C. 154(b) by 462 days.

(21) Appl. No.: 12/673,235

(22) PCT Filed: Nov. 11, 2008

(86) PCT No.: PCT/JP2008/003260
§ 371 (c)(1),
(2), (4) Date: Feb. 12, 2010

(87) PCT Pub. No.: WO2009/063614
PCT Pub. Date: May 22, 2009

(65) Prior Publication Data
US 2011/0197034 A1    Aug. 11, 2011

(30) Foreign Application Priority Data
Nov. 14, 2007 (JP) .................................. 2007-295226

(51) Int. Cl.
*G11C 16/04* (2006.01)
*G06F 13/00* (2006.01)
(52) U.S. Cl. ..................... 711/103; 365/185.33; 711/154

(58) Field of Classification Search ............. 365/185.33; 711/103, 154
See application file for complete search history.

(56) References Cited

U.S. PATENT DOCUMENTS

| | | | | |
|---|---|---|---|---|
| 6,092,221 | A  * | 7/2000 | Hiratsuka | 714/47.2 |
| 6,230,233 | B1 | 5/2001 | Lofgren et al. | |
| 7,596,656 | B2 * | 9/2009 | Elhamias | 711/103 |
| 2006/0265545 | A1 * | 11/2006 | Entani | 711/103 |
| 2007/0266200 | A1 * | 11/2007 | Gorobets et al. | 711/103 |

FOREIGN PATENT DOCUMENTS

| | | |
|---|---|---|
| JP | 05-282880 | 10/1993 |
| JP | 10-091535 | 4/1998 |
| JP | 2003-263894 | 9/2003 |

* cited by examiner

*Primary Examiner* — Charles Rones
*Assistant Examiner* — Mehdi Namazi
(74) *Attorney, Agent, or Firm* — Renner, Otto, Boisselle & Sklar, LLP

(57) ABSTRACT

When a write command is issued, new data is written into a free physical block of a nonvolatile memory (110). Here, if data of the same logical block has been written already, the block is erased and a recording state is judged by a recording state judgment unit (126). A physical block is swapped according to the number of write processes performed. Thus, it is possible to effectively perform a swap without increasing the number of write processes in a particular area, thereby increasing the lifetime of a nonvolatile storage module.

14 Claims, 27 Drawing Sheets

FIG. 3A

| PBN | BST | S | WC |
|---|---|---|---|
| 0 | 1 | 0 | a+X+1 |
| 1 | 0 | 0 | m |
| 2 | 0 | 0 | m |
| ⋮ | ⋮ | ⋮ | ⋮ |
| P−3 | 0 | 0 | m |
| P−2 | 1 | 0 | a+X |
| P−1 | 1 | 0 | a+X |
| k ||||
| WCall ||||

| LBN | PBN |
|---|---|
| 0 | 0 |
| 1 | 1 |
| 2 | 2 |
| ⋮ | ⋮ |
| L−1 | P−3 |

132

F I G. 6

| No. of times of rewritings | Data retention time r(H) |
|---|---|
| 100 | 501187 |
| 200 | 116906 |
| 300 | 49894 |
| 400 | 27269 |
| 500 | 17067 |
| 600 | 11638 |
| 700 | 8420 |
| 800 | 6360 |
| 900 | 4966 |
| 1000 | 3981 |
| 2000 | 929 |
| 3000 | 396 |
| 4000 | 217 |
| 5000 | 136 |
| 6000 | 92 |
| 7000 | 66 |
| 8000 | 50 |
| 9000 | 39 |
| 10000 | 32 |

| PBN | BST | S | WC |
|---|---|---|---|
| 0 | 0 | 0 | a+X |
| 1 | 0 | 0 | m |
| 2 | 0 | 0 | m |
| ... | ... | ... | ... |
| P-3 | 0 | 0 | m |
| P-2 | 1 | 0 | a+X |
| P-1 | 1 | 0 | a+X |
| | | k | WCall |

⇑ Temporarily update

131

| PBN | BST | S | WC |
|---|---|---|---|
| 0 | 1 | 0 | a+X+1 |
| 1 | 0 | 0 | m |
| 2 | 0 | 0 | m |
| ... | ... | ... | ... |
| P-3 | 0 | 0 | m |
| P-2 | 0 | 0 | a+X |
| P-1 | 1 | 0 | a+X |
| | | k | WCall |

148
| PBN | BST |
|---|---|
| 0 | 1 |

158
| PBN | BST |
|---|---|
| 1 | 0 |

F I G. 2 0

| Basic condition | Speed condition | | Power condition (allowable power Pa) |
|---|---|---|---|
| | Tg | Tt | |
| 1 | 1 (S) | 256 (mS) | 50 (mW) |

F I G. 2 2
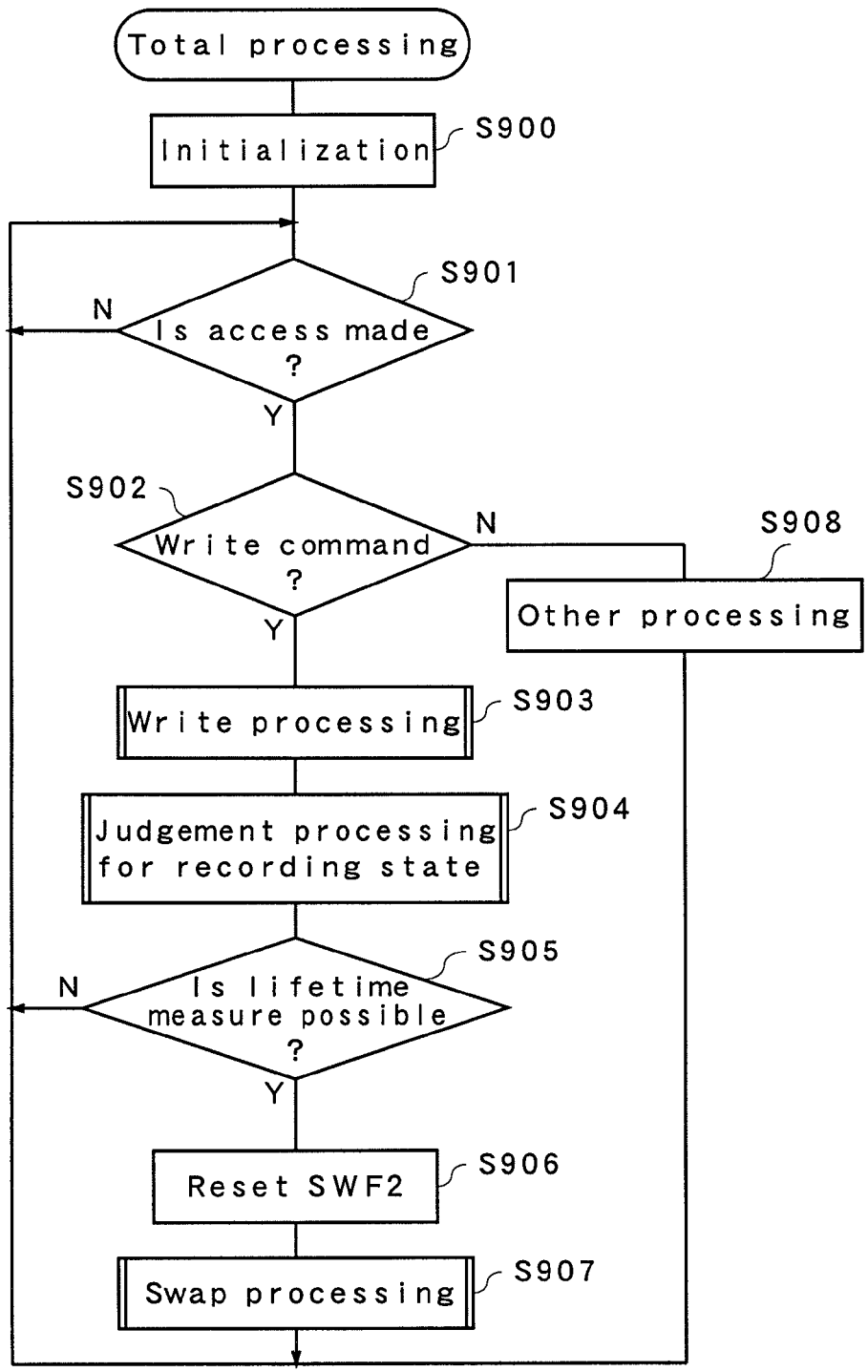

MEMORY CONTROLLER, NONVOLATILE STORAGE MODULE, ACCESS MODULE AND NONVOLATILE STORAGE SYSTEM

TECHNICAL FIELD

The present invention relates to a nonvolatile storage module such as a semiconductor memory card having a nonvolatile memory, a memory controller for controlling the nonvolatile memory, an access module and nonvolatile storage system formed by adding the access module as a structural element to the nonvolatile storage module.

BACKGROUND ART

A nonvolatile storage module having a rewritable nonvolatile memory, which is typified by a semiconductor memory card, has been increasingly demanded as a removable storage device. Although the semiconductor memory card is much more expensive than an optical disc or a tape media, due to small size, light weight, seismicity and convenience in handling, it is in great demand as a recording medium for portable devices such as digital still cameras and mobile phones. In recent years, with an increase in capacity of the semiconductor memory card, application of the memory card to an alternative device for a hard disc of a personal computer and recording media for a digital television has been considered.

The semiconductor memory card includes a flash memory as a nonvolatile main memory and a memory controller for controlling the memory. According to instructions for reading and writing from the access module of the digital still camera and the personal computer, the memory controller controls reading and writing with respect to the flash memory. Some non-removable nonvolatile storage modules are incorporated into the digital still camera and a portable audio equipment itself.

Since the flash memory requires a relatively long time to writing and erasing to and from a memory cell array as a storage unit, data in a plurality of memory cells can be collectively erased and written. Specifically, the flash memory includes a plurality of physical blocks and each physical block includes a plurality of pages. Erasure from the flash memory is performed in units of physical blocks and writing to the flash memory is performed in units of pages.

In recent years, in response to demands for larger capacity and lower costs, a multi-level NAND flash memory which can store information of two bits in one memory cell as one type of the flash memory has become a mainstream of the flash memory. In the multi-level NAND flash memory, it is difficult to ensure reliability of the memory cell and therefore, the number of times of rewriting is small. A conventional binary NAND flash memory has the guaranteed number of times of rewriting of 100 thousand and guaranteed data retention time of 10 years. The multi-level NAND flash memory has the guaranteed number of times of rewriting of 10 thousand or less and as shown in, for example, FIG. 1, trades off the number of times of rewriting for the data retention time.

The above-mentioned number of times of rewriting and data retention time are directly connected to the lifetime of the nonvolatile storage module such as the semiconductor memory card and lifetime of the nonvolatile storage system including the nonvolatile storage module.

To extend the lifetime as long as possible, the conventional flash memory employs an address management method called as wear leveling in which rewriting does not concentrate on a particular physical block. For example, in Patent document 1, in writing of data, the data is written to a free physical block as a free area. At this time, when old data corresponding to the logical address is stored, the old data stored in the physical block is erased and the physical block is managed as a free block. This way is figured out so as not to concentrate writing on the particular physical block. This is a method of writing data to the free area, holding the old data until completion of data writing and using the free area including a spare area for replacement of a bad block to perform wear leveling.

However, in a nonvolatile semiconductor memory device in Patent document 1, when the number of remaining free blocks becomes smaller, in a case where data at a certain logical address is rewritten many times, the data is frequently moved between the free block and physical block to which the data at the logical address is allocated. In other words, the number of times of rewriting of the certain physical block (hereinafter referred to as alternate processing) increases rapidly. This phenomenon is hereinafter referred to as "localization of alternate area".

To address this problem, for example, in a semiconductor disc device in Patent document 2, the number of times of rewriting of each physical block is held and data is swapped based on the number of times of rewriting. Specifically, in rewriting data (data X), a physical block (physical block A) which stores an old version of the data X therein is erased and rewritten. In a case where the number of times of rewriting of the physical block A is large, the data X is written to another physical block (physical block B) with the small number of times of rewriting. However, when data Y has been already stored in the physical block B, the original data X in the physical block A is erased and then, the data Y is moved to the physical block A. After that, new data X is written to the physical block B. In this manner, when the data X is updated thereafter, the physical block B is rewritten. As described above, dynamic wear leveling is achieved by performing swap between the physical blocks A and B based on the number of times of rewriting.

Patent document 1: Japanese Unexamined Patent Publication No. 2003-263894

Patent document 2: Japanese Unexamined Patent Publication No. 1993-282880

DISCLOSURE OF INVENTION

Problem to be Solved by the Invention

However, in Patent document 2, in rewriting of the data X, when an erroneous power disconnection occurs after the old version of the data X is erased, the old data cannot be disadvantageously recovered. Furthermore, there is a system problem that swap processing causes an increase in overheads of speed and power, resulting in that contents such as moving images requiring real-time storage cannot be recorded.

Thus, in consideration of the above-mentioned problems, an object of the present invention is to provide a memory controller, a nonvolatile storage module, an access module, a nonvolatile storage system which have less localization of alternate area than conventional, have long lifetime and can recover old data even when power disconnection occurs.

Means to Solve the Problems

To solve the problems, a memory controller, connected to a nonvolatile memory, and reading and writing data according to an external access instruction, comprises: an address management unit for managing at least free area of said nonvolatile memory and selecting a writing destination area from the free area of said nonvolatile memory at data writing; a recording state judgement unit for performing swap necessity judgement of a storage area based on a recording state of said nonvolatile memory; and a reading and writing control unit for controlling data reading and writing, determining a swap target area according to a judgement result of said recording state judgement unit and performing swap processing.

Said recording state judgement unit may perform swap necessity judgement based on numbers of times of rewriting of physical blocks which constitute said nonvolatile memory.

Said recording state judgement unit may judge necessity of swap based on a maximum value of said numbers of times of rewriting and one of an average value and a minimum value of said numbers of times of rewriting.

Said reading and writing control unit may determine a swap target area based on numbers of times of rewriting of physical blocks which constitute said nonvolatile memory.

Said reading and writing control unit may determine a swap target area based on numbers of times of rewriting of physical blocks which constitute said nonvolatile memory and depending on whether or not a physical block is a free physical block.

Said memory controller further may include a lifetime judgement unit for judging lifetime relating to a data retention time of data stored in said nonvolatile memory and informing the lifetime information to outside.

Said memory controller may further include a system condition reception unit for receiving a system condition designated from outside and a system condition judgement unit for performing swap possibility judgement of a storage area based on said system condition, and said reading and writing control unit may control data reading and writing and performs determination of a swap target area and swap processing according to judgement results of said recording state judgement unit and said system condition judgement unit.

Said system condition may be at least one of a requirement relating to access speed, requirement relating to power and requirement relating to lifetime measure.

Said system condition judgement unit may determine a number of swap based on said system condition.

Said system conditions reception unit may receive information on a type of said nonvolatile memory, and said system condition judgement unit performs swap possibility judgement according to the type of the said nonvolatile memory.

Said system condition reception unit may receive information on a type of said nonvolatile storage module mounting the memory controller thereon, and said system condition judgement unit judges possibility of swap according to the type of said nonvolatile storage module.

In addition, a nonvolatile storage module for reading and writing data according to an external access instruction comprising: said nonvolatile memory; and said memory controller can be obtained.

An access module of the present invention is connected to the nonvolatile storage module for writing data to said nonvolatile storage module and reading data from said nonvolatile storage module and comprises: a lifetime information display unit for displaying lifetime information received from said nonvolatile storage module.

An access module of the present invention is connected to the nonvolatile storage module for writing data to said nonvolatile storage module and reading data from said nonvolatile storage module and comprises: a system condition informing unit for informing said system condition to said nonvolatile storage module.

A nonvolatile storage system of the present invention comprises: an access module; and a nonvolatile storage module for reading and writing data according to an access instruction from said access module, wherein said nonvolatile storage module includes: a nonvolatile memory; and one of the a memory controllers mentioned above.

Effectiveness of the Invention

According to the present invention, based on determination of a writing destination area by selection of the free area by the address management unit, that is, wear leveling by the alternate processing, the recording state judgement unit performs the swap necessity judgement according to the recording state and the reading and writing control unit performs determination of the swap target area and swap according to the swap necessity judgement. Thus, the localization of alternate area as the above-mentioned problem in Patent document 1 can be solved and the lifetime of the nonvolatile storage module can be extended. Furthermore, according to the present invention, since new data is written to the free physical block, the power disconnection problem as the second problem in Patent document 2 can be solved.

Since the recording state judgement unit detects the alternate area localization, swap can be performed when the alternate area is localized. Furthermore, the alternate area localization can be easily detected based on the number of times of rewriting of the physical block. In addition, swap can be effectively performed by determining the swap target based on the number of times of rewriting or a state whether or not the block is a free block in addition to the number.

BRIEF DESCRIPTION OF DRAWINGS

FIG. 3A is a memory map showing a physical area management table 131.

FIG. 3B is a memory map showing a logical-physical conversion table 132.

FIG. 6 is a memory map showing a lifetime table 128a.

FIG. 13A is a memory map showing temporary update of the physical area management table 131 at writing.

FIG. 20 is a diagram showing an example of system conditions.

FIG. 22 is a flow chart showing overall processing by a nonvolatile storage module 100C in accordance with the third embodiment of the present invention.

Figure 1:
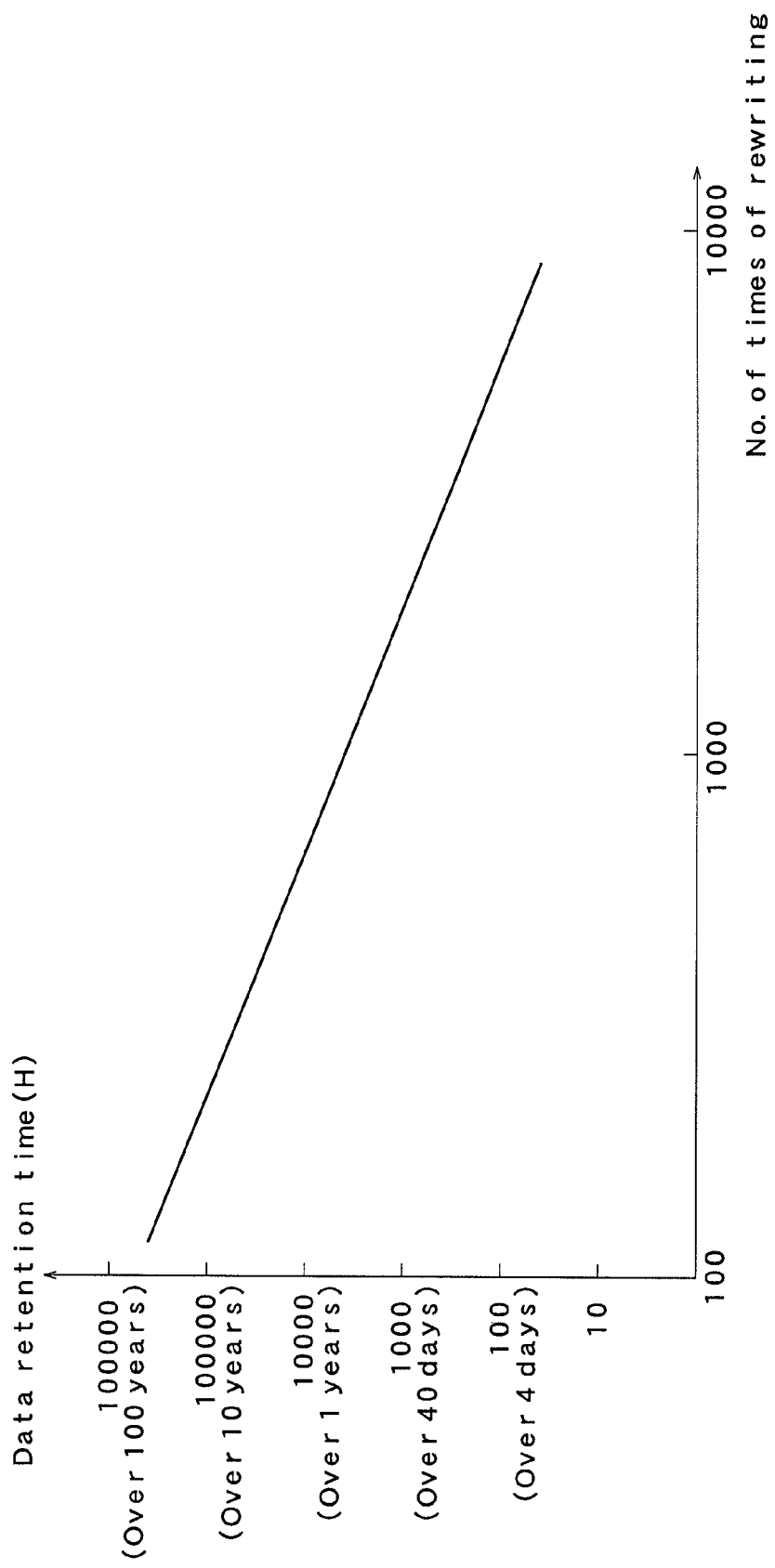
FIG. 1 is a graph showing reliability of a multi-level flash memory.

DESCRIPTION OF REFERENCE NUMERALS 100A, 100B, 100C Nonvolatile storage module
120A, 120B, 120C Memory controller
121 Host interface
122 Buffer
123 Memory interface
124 CPU unit
125 Address management unit
126 Recording state judgement unit
127, 163, 173 Reading and writing control unit
128 Lifetime judgement unit
128a Lifetime table
130 Nonvolatile memory
131 Physical area management table
132 Logical-physical conversion table
140, 150 Reading circuit
141, 151 OR gate
142, 144, 152, 154 Selector
143, 145, 148, 153, 155, 158 Register
146, 156 Comparator
147, 157 AND gate
161, 171 System condition reception unit
162, 172 System condition judgement unit
200A, 200B Access module
201 Lifetime information display unit
202 System condition informing unit

BEST MODE FOR CARRYING OUT THE INVENTION

First Embodiment

Figure 2:
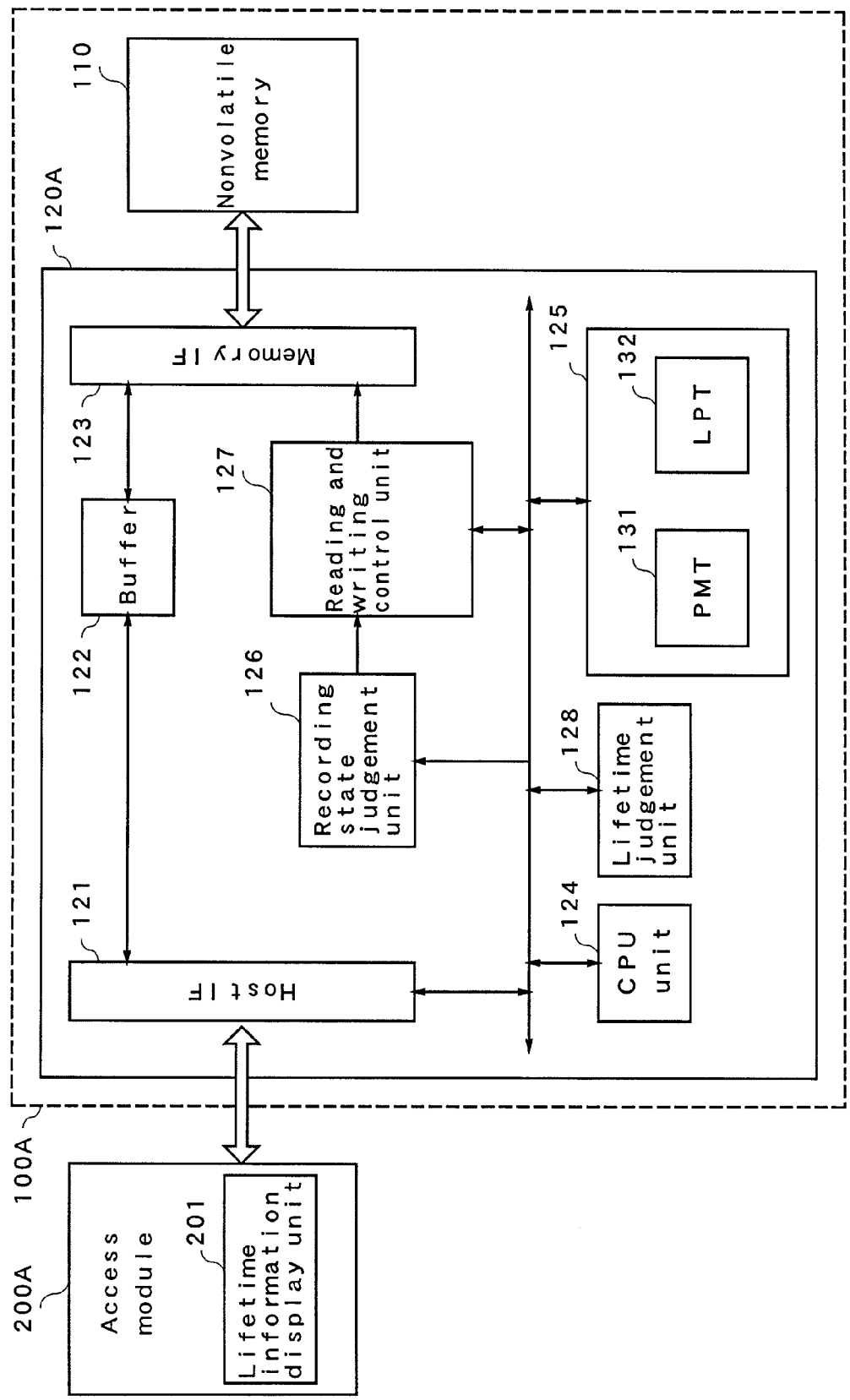
FIG. 2 is a block diagram showing a nonvolatile storage system in accordance with a first embodiment of the present invention.

FIG. 2 is a block diagram showing a nonvolatile storage system in accordance with a first embodiment of the present invention. In FIG. 2, the nonvolatile storage system includes a nonvolatile storage module 100A and an access module 200A. The access module 200A includes a lifetime information display unit 201. The nonvolatile storage module 100A includes a nonvolatile memory 110 and memory controller 120A. The memory controller 120A includes a host interface (host IF) 121, a buffer 122, a memory interface (memory IF) 123, a CPU unit 124, an address management unit 125, a recording state judgement unit 126, a reading and writing control unit 127 and a lifetime judgement unit 128.

The nonvolatile memory 110 is a flash memory and has P physical blocks. The physical block is an erasing unit and all of the P physical blocks are used for data recording. The physical block is a writing unit and consists of a plurality of pages. It is assumed that a logical space which can be used by the access module 200A is L logical blocks. It is assumed that L is an integral number which is smaller than P. The (P−L) physical blocks are used as a spare area and management area. The spare area is used as a work area at rewriting or alternate area of a bad block. The management area is an area for storing a physical area management table 131 and logical-physical conversion table 132 therein.

The host interface (host IF) 121 is a block which is connected to the access module 200A through an external bus to receive commands for reading and writing data, logical address and data from the access module 200A and sends data to the access module 200A in reading of the data.

The memory interface (memory IF) 123 is connected to the nonvolatile memory 110 through a memory bus to write data temporarily stored in the buffer 122 to the nonvolatile memory 110 according to an instruction of the reading and writing control unit 127 and reads data stored in the nonvolatile memory 110 to the buffer 122. The memory interface also swap data between two physical blocks in the nonvolatile memory 110 according to an instruction of the reading and writing control unit 127.

The CPU unit 124 controls the whole of the memory controller 120A.

The address management unit 125 generates a physical address of the nonvolatile memory 110 based on the logical address received from the access module 200A according to the instruction of the reading and writing control unit 127. The address management unit 125 includes the below-mentioned physical area management table 131 (expressed as PMT in the figure) and logical-physical conversion table 132 (expressed as LPT in the figure). Hereinafter, the physical block is represented as PB, the logical block is represented as LB, a physical block number is represented as PBN, a logical block number is represented as LBN, the physical block having the physical block number PBN of 0 is represented as PB0 and the logical block having the logical block number LBN of 0 is represented as LB0.

FIG. 3A is a memory map showing the physical area management table 131. The table 131 holds a block status BST, a select completion flag S representing that the respective block has been already selected as a swap target and a number of times of rewriting WC, for each of the physical block numbers PB0 to PB(P−1). In the block status, a value 0 represents a used block, a value 1 represents a free block and a value 2 represents a bad block. For simplification, in the present embodiment, it is assumed that there is no block having the value 2, that is, no bad block. Each time data writing processing is performed, the address management unit 125 detects a free block to which data is written referring to the block status BST of the physical area management table 131 according to the instruction of the reading and writing control unit 127. The physical area management table 131 also holds the number of times of swap k and the total number of times of rewriting WCall. It is assumed that WCall is incremented by 1 each time writing to one logical block is performed in writing processing.

FIG. 3B is a memory map showing the logical-physical conversion table 132 included in the address management unit 125. The conversion table 132 holds the physical block number PBN corresponding to the logical block number LBN.

The recording state judgement unit 126 determines the recording status of the nonvolatile memory 110, in particular, the localization of alternate area, by appropriately referring to the physical area management table 131 and outputs a swap necessity judgement result to the reading and writing control unit 127.

The reading and writing control unit 127 writes data to the nonvolatile memory 110 according to the command from the access module 200A and reads data from the nonvolatile memory 110. When a write command is issued, the reading and writing control unit 127 outputs an instruction to acquire PBN of a free physical block to the address management unit 125. The reading and writing control unit 127 has acquisition circuits 127A, 127B for acquiring PBN as a swap target. The acquisition circuits 127A, 127B are circuits for reading the physical block as a swap target and a number of times of rewriting according to the swap necessity judgement result outputted from the recording state judgement unit 126.

Figure 4:
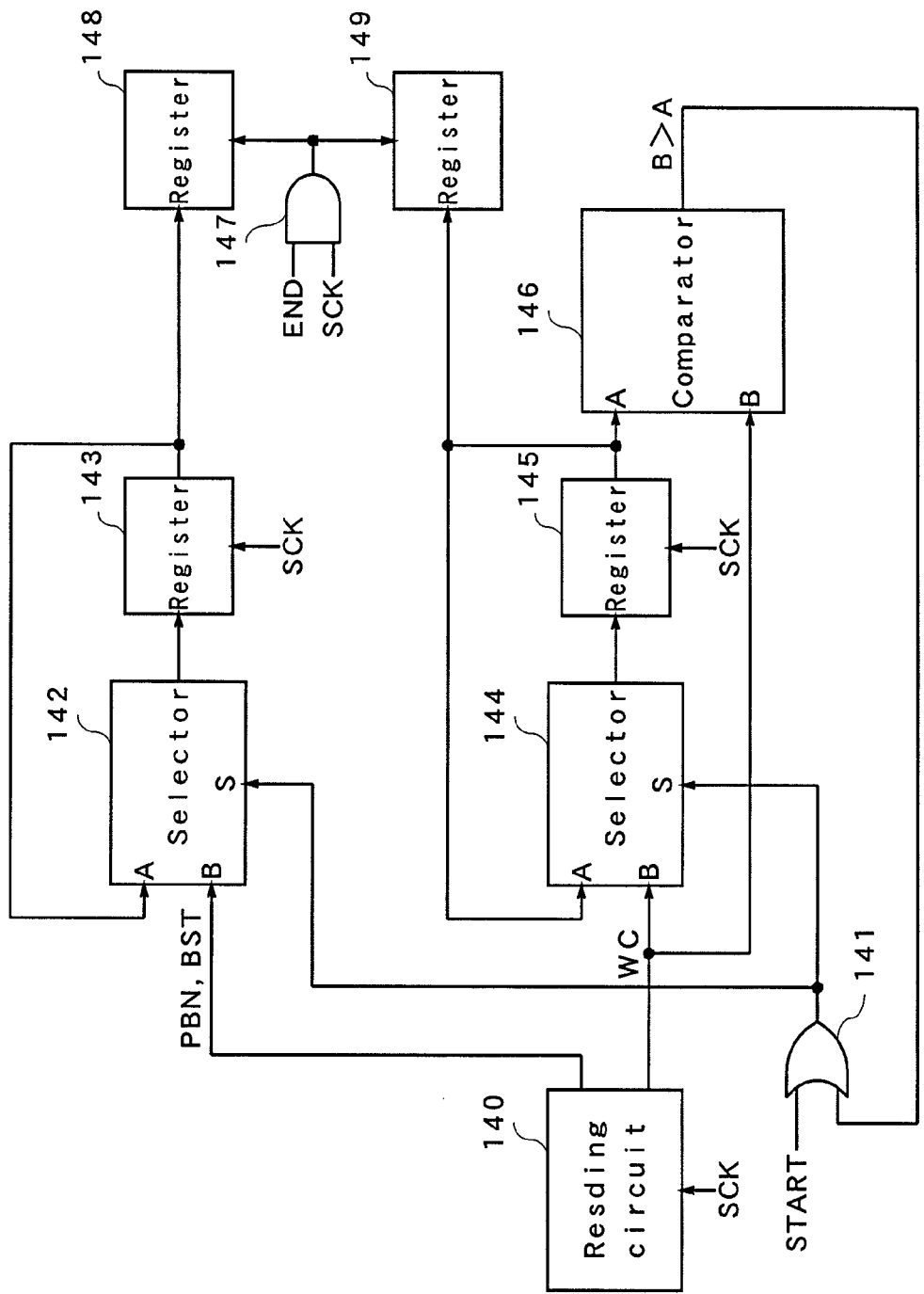
FIG. 4 is a circuit diagram showing an acquisition circuit 127A of PBsa.

FIG. 4 is a block diagram showing the acquisition circuit 127A. In FIG. 4, a reading circuit 140 is a circuit for sequentially reading the number of times of rewriting WC, physical block number PBN and block status BST from the physical area management table 131 from the PBN with the S flag of 0 according to a system clock SCK. At start of reading, a START flag is the value of 1 and is outputted to an OR gate 141. Each of a selector 142 and selector 144 selects an A input when the output of the OR gate 141 is 0 and selects a B input when the output of the OR gate 141 is 1. A register 143 temporarily holds PBN and BST therein and a register 145 temporarily holds WC of the selected PB. A comparator 146 compares the WC held in the register 145 (A input) with the number of times of rewriting WC read from the PBN with the next S flag of 0 (B input), and the B input is smaller, a comparison output is defined as 0 and outputted to the OR gate 141. The registers 143, 145 also give the outputs to registers 148, 149. An AND gate 147 holds the outputs of the registers 143, 145 when values of the system clock SCK and end flag representing termination become 1. Thereby, as described later, physical block number PBN having the maximum number of times of rewriting and its status BSP are held in the register 148. The maximum number of times of rewriting M is held in the register 149.

Figure 5:
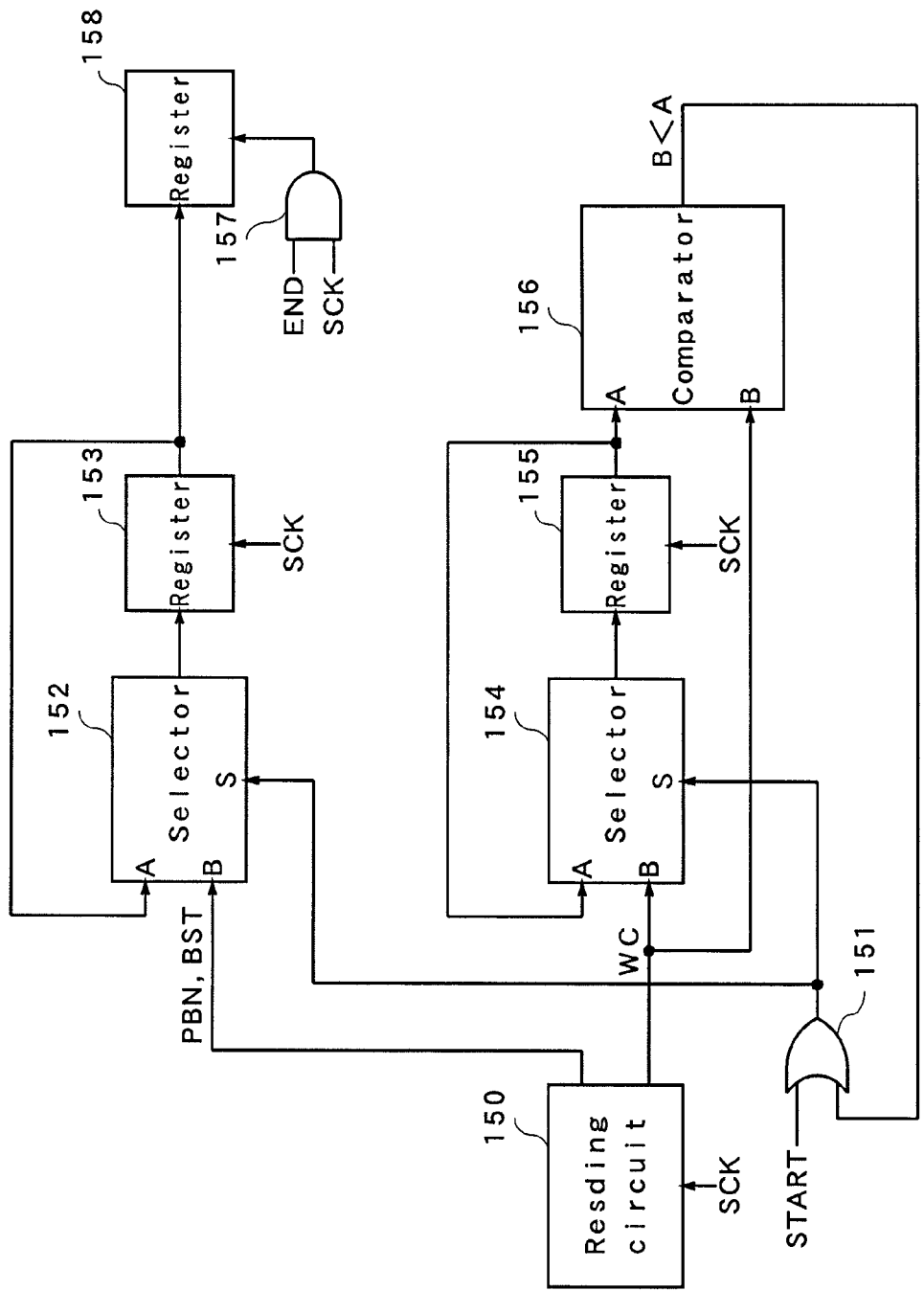
FIG. 5 is a circuit diagram showing an acquisition circuit 127B of PBsb.

FIG. 5 is a block diagram showing the acquisition circuit 127B included in the reading and writing control unit 127. Like the abovementioned acquisition circuit 127A, the acquisition circuit 127B includes a reading circuit 150, a OR gate 151, selectors 152, 154, registers 153, 155, 158, a comparator 156 and an AND gate 157. The acquisition circuit 127B has the comparator 156 which is different from the comparator 146 in inequality sign. In addition, the acquisition circuit 127B has no register corresponding to the register 149 and the other elements are the same as those in the acquisition circuit 127A.

The lifetime judgement unit 128 includes a lifetime table 128a shown in FIG. 6. The lifetime table 128a is a table which records the data retention time r with respect to the number of times of rewriting WC therein in units of hours and is held in a read-only memory. Referring to the lifetime table 128a, the lifetime judgement unit 128 judges the lifetime of the nonvolatile storage module 100A and informs the lifetime to the access module 200A.

Operation of the nonvolatile storage system in accordance with the first embodiment of the present invention will be described. First, the localization of alternate area and its suppression will be basically described and then, specific operation will be described.

[Localization of Alternate Area]

Figure 7A:
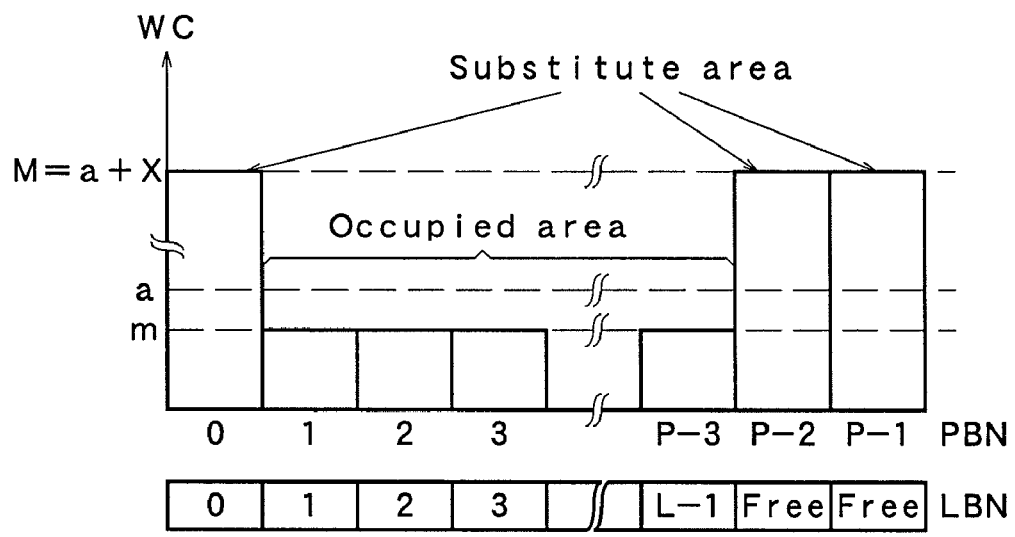
FIG. 7A is an explanatory view showing a recording state before writing.
Figure 7B:
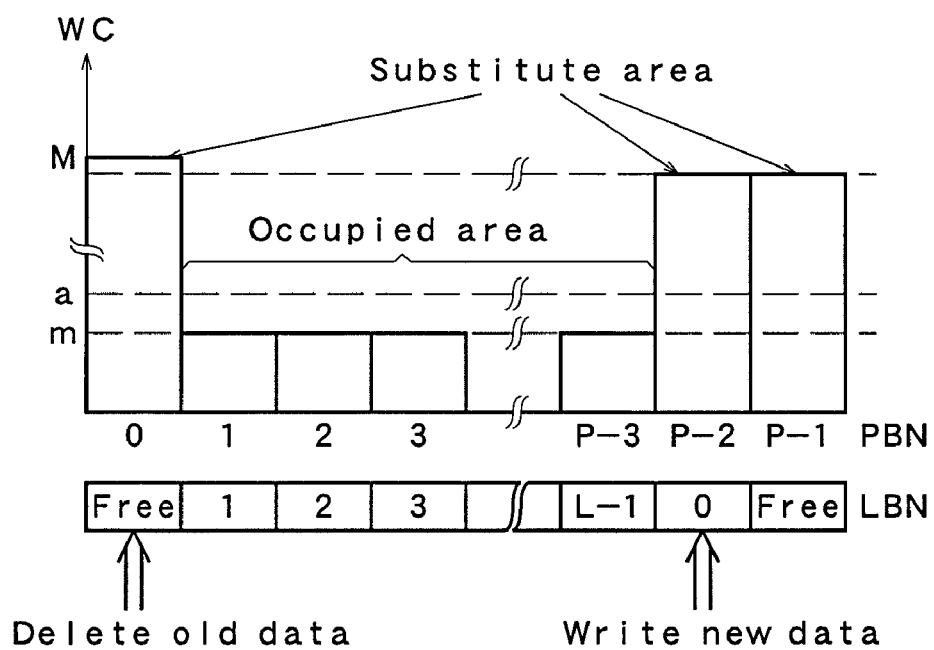
FIG. 7B is an explanatory view showing a recording state after writing.

First, the recording state of the nonvolatile memory 110 will be described. FIGS. 7A to 7F show the number of times of rewriting to the physical blocks PB0 to PB (P−1) and LBN allocated to each of the physical blocks or the physical block is a free block. FIG. 7A is an explanatory view showing the recording state before writing, FIG. 7B is an explanatory view showing the recording state after writing and FIGS. 7C to 7F are explanatory views showing the recording states before swap, after the first swap, after the second swap and after third (last) swap, respectively. Hereinafter, it is given that WC is the number of times of rewriting, m is the minimum number of times of rewriting, a is the average number of times of rewriting, M is the maximum number of times of rewriting, X is a threshold value representing a difference between a maximum value and average value of the number of times of rewriting to the physical block for determining whether or not the swap processing is started.

In FIG. 7A, the physical blocks are divided into a PB group to which data hardly rewritten is allocated, PS to which data frequently rewritten (LB0 in the present embodiment) is allocated and free block used for rewriting LB0.

Such recording state can occur in the case where the nonvolatile storage module is attached to a TV to record a TV program. Specifically, it is assumed that programs to be recorded for a long time in previously recorded programs remain recorded in the nonvolatile storage module and program which are unnecessary to be recorded for a long time, such as news, are frequently recorded and erased in a repeated manner. Here, it is assumed that the programs to be recorded for a long time correspond to the logical blocks LB1 to LB(L−1) and the program which are unnecessary to be recorded for a long time correspond to the logical block LB0. In this case, as shown in FIG. 7A, the number of times of rewriting to the physical blocks PB1 to PB(P−3) for recording LB1 to LB(L−1) remains to be small and the number of times of rewriting WC to the physical blocks PB0, PB(P−2), PB(P−1) used for recording and erasure of LB0 increases. Hereinafter, an area for the former is referred to as an occupied area and an area for the latter is referred to as an alternate area. In FIG. 7A, a difference between the maximum number of times of rewriting M and the average number of times of rewriting a is equal to the threshold value X, which is a typical example of the localization of alternate area.

When the above-mentioned circumstance continues, the value of WC in the alternate area continuously increases, resulting in that the lifetime of the nonvolatile storage module early expires. Thus, in the nonvolatile storage module 100A in the present embodiment, the recording state judgement unit 126 detects the localization of alternate area based on WC, and the reading and writing control unit 127 performs swap based on the number of times of rewriting to suppress the alternate area localization.

The alternate area localization is suppressed in following two steps.

(1) Detection of Alternate Area Localization

The recording state judgement unit 126 judges whether or not the localization of alternate area occurs according to a formula (1) and when the formula (1) holds, transmits judgement that swap is necessary to the reading and writing control unit 127.

$$M-a>x \quad (1)$$

A specific calculation method will be described later. The threshold value X may be determined depending on a processing capacity of the nonvolatile storage module 100A and reliability of the nonvolatile memory 110.

(2) Swap Processing (2-1) Selection of Swap Target

A swap target PB is selected from the alternate area (area in which WC is larger than a) in a descending order of the number of times of rewriting and a swap target PB is selected from the occupied area (area in which WC is smaller than a) in an ascending order of the number of times of rewriting. When the swap targets PB are collectively selected at detection of the localization of alternate area, since overheads of selection processing in terms of time are problematic, the swap targets PB necessary for the next swap processing are selected for each writing or swap of one block.

(2-2) Prohibition of Duplicate Swap

When the same swap target is continuously selected, useless swap is repeated and therefore, to prevent this, duplicate selection is prohibited until the predetermined number of times of swap is completed. Given that the predetermined number of times of swap is K1, K1 is found according to a formula (2). Where, in the formula (2), MIN represents a function taking a minimum value.

$$K1 = \text{MIN}(\text{the number of PB which satisfies } WC > a, \text{ the number of } PB \text{ which satisfies } WC < a) \quad (2)$$

(2-3) Execution of Swap

By swapping the alternate area and occupied area of the block as the swap target thus determined, the alternate area, that is, an area in which the number of times of rewriting is conspicuous is dispersed.

Figure 8:
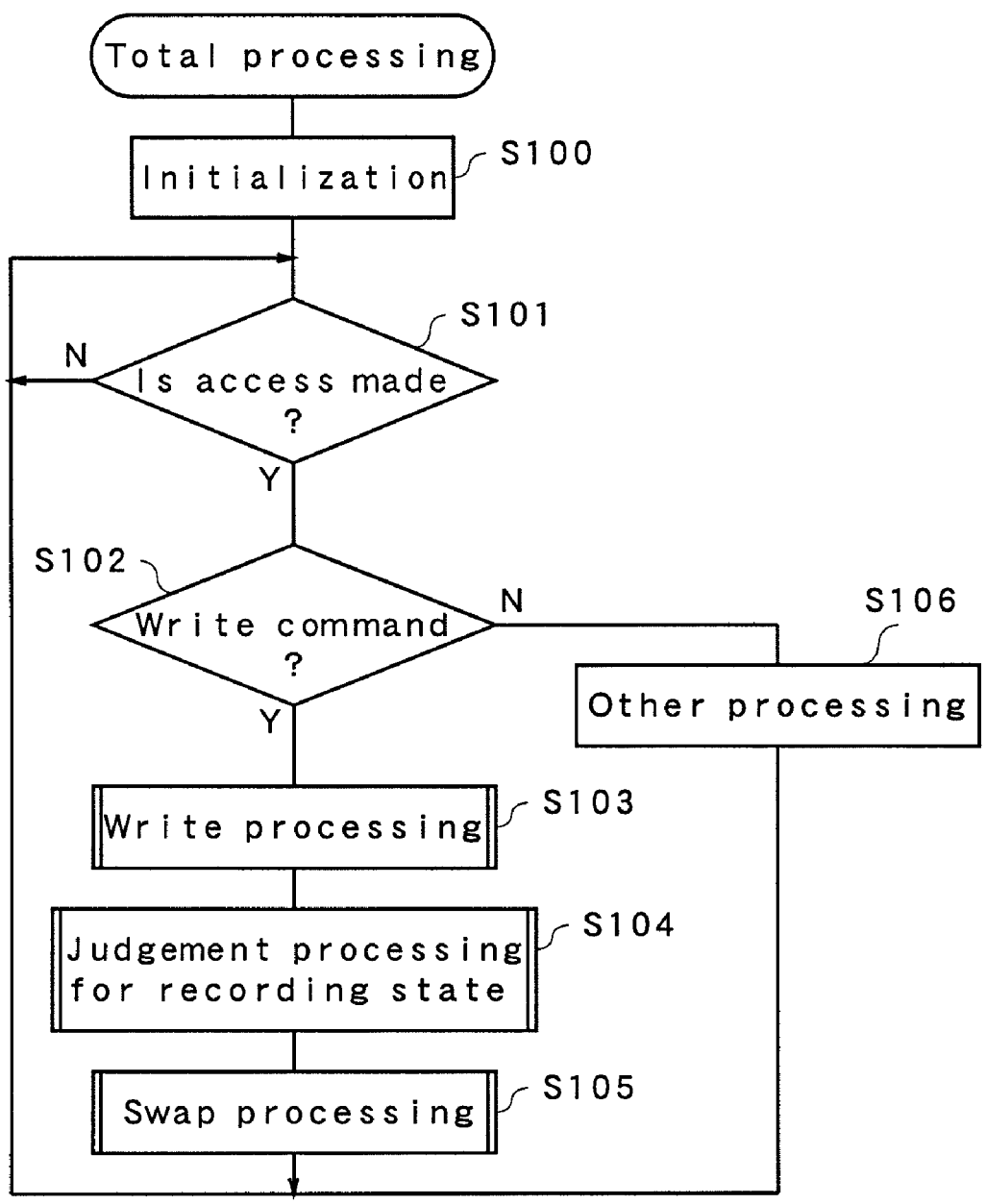
FIG. 8 is a flow chart showing overall processing by a nonvolatile storage module 100A in accordance with the first embodiment of the present invention.

In the above-mentioned suppression of the alternate area localization, detection of the alternate area localization and swap processing will be described below referring to a flow chart of FIG. 8 showing overall processing and flow charts of FIG. 9 and subsequent figures showing each processing. For simplification, it is assumed that, in data writing, a write command is transmitted for each logical block. If the nonvolatile storage module 100A automatically performs the swap processing when an access instruction is not issued from the access module 200A, data can be destroyed due to an error such as power disconnection. This is irrational to the user. Therefore, the swap processing is basically performed according to the access instruction of the access module 200A. In the present embodiment, each time the write command is received, the swap processing is performed together with the writing processing.

When the nonvolatile storage module 100A is attached to the access module 200A, power source is fed from the access module 200A to the nonvolatile storage module 100A and the nonvolatile storage module 100A starts initialization processing (S100). In the initialization processing, the memory controller 120A reads the physical area management table 131 and logical-physical conversion table 132 which are held in the management area of the nonvolatile memory 110 to a RAM provided in the address management unit 125. At this time, the physical area management table 131 and logical-physical conversion table 132 hold information shown in FIGS. 3A and 3B, respectively, which corresponds to the recording state shown in FIG. 7A.

In a case where an access is made from the access module 200A after that (S101), the CPU unit 124 analyzes a command transmitted from the access module 200A (S102). In a case where the command is the write command, the procedure proceeds to S103 and shifts to a series of processing from writing to swap, and in a case where the command is the other command such as a read command, the procedure proceeds to S106.

Here, it is assumed that LB0 is updated and the write command to write new data is issued. The new data is held in the buffer 122 once. Next, a series of processing from writing to swap will be described referring to FIG. 9. First, at S103, the writing processing is performed. FIG. 9 shows details of the writing processing. At S200, the reading and writing control unit 127 instructs the address management unit 125 to acquire the free physical block of a writing destination (hereinafter referred to as free PB). The address management unit 125 searches PB from a leading address in the physical area management table 131. A start position of search of the free PB by the address management unit 125 is set to the leading address for each initialization processing, and normal processing after the initialization processing, search continues from the address searched last time and when search reaches a trailing address, that is, PB(P−1), search returns to the leading address. In this case, since initialization is completed, PB with the value of BST of 1 is searched from the leading address PB0 in the ascending order.

Figure 13B:
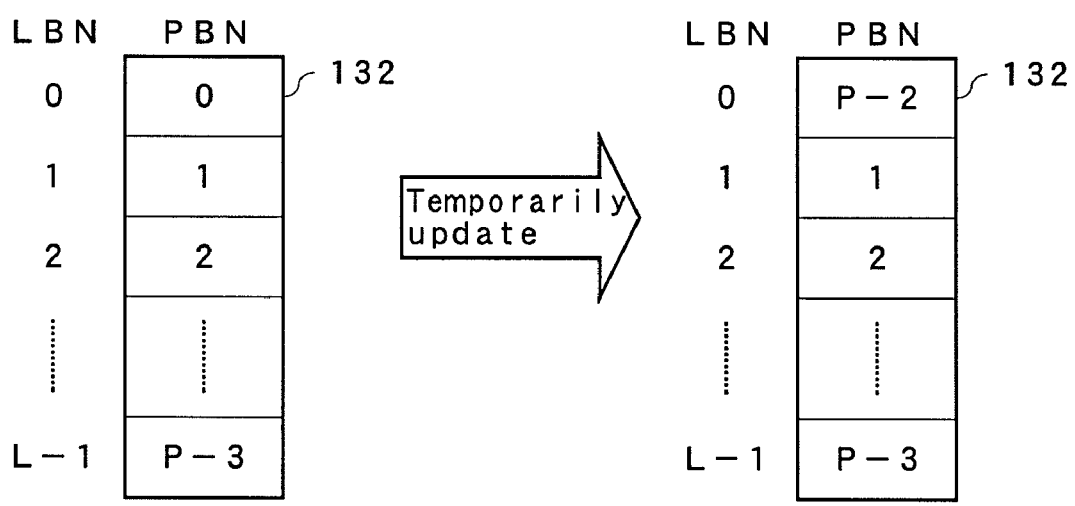
FIG. 13B is a memory map showing temporary update of the logical-physical conversion table 132 at writing.

FIG. 13A is a memory map showing temporary update of the physical area management table 131 at writing and FIG. 13B is a memory map showing temporary update of the logical-physical conversion table 132 at writing. Since PB (P−2) is the first free block in the state on a left side of FIG. 13A, this block is informed to the reading and writing control unit 127 as a writing destination block number. In FIG. 13A, the registers 148, 158 of the acquisition circuits 127A, 127B are registers for temporarily holding PBN and block status BST of the PBs (PBsa and PBsb) as the swap targets therein. PBsa is the swap target block belonging to the area in which the number of times of rewriting is larger, that is, the alternate area, while PBsb is the swap target block belonging to the area in which the number of times of rewriting is smaller, that is, the occupied area.

Subsequently, referring to the logical-physical conversion table 132 shown in the left side of FIG. 13B, an area in which old data in LB0 is recorded, that is, PB0 is acquired. Next, as shown in FIG. 13A, in the physical area management table 131, the value of BST of PB0 is temporarily updated to 1 and the value of BST of PB (P−2) is temporarily updated to 0. Furthermore, since the number of times of rewriting of PB0 increases by 1 by erasure processing of the old data at S205 described later, as shown in FIG. 13A, WC to PB0 is temporarily updated from a+X to a+W+1. As shown in FIG. 13B, the physical block address PBN corresponding to LB0 in the logical-physical conversion table 132 is temporarily updated from 0 to P−2 (S201).

Figure 9:
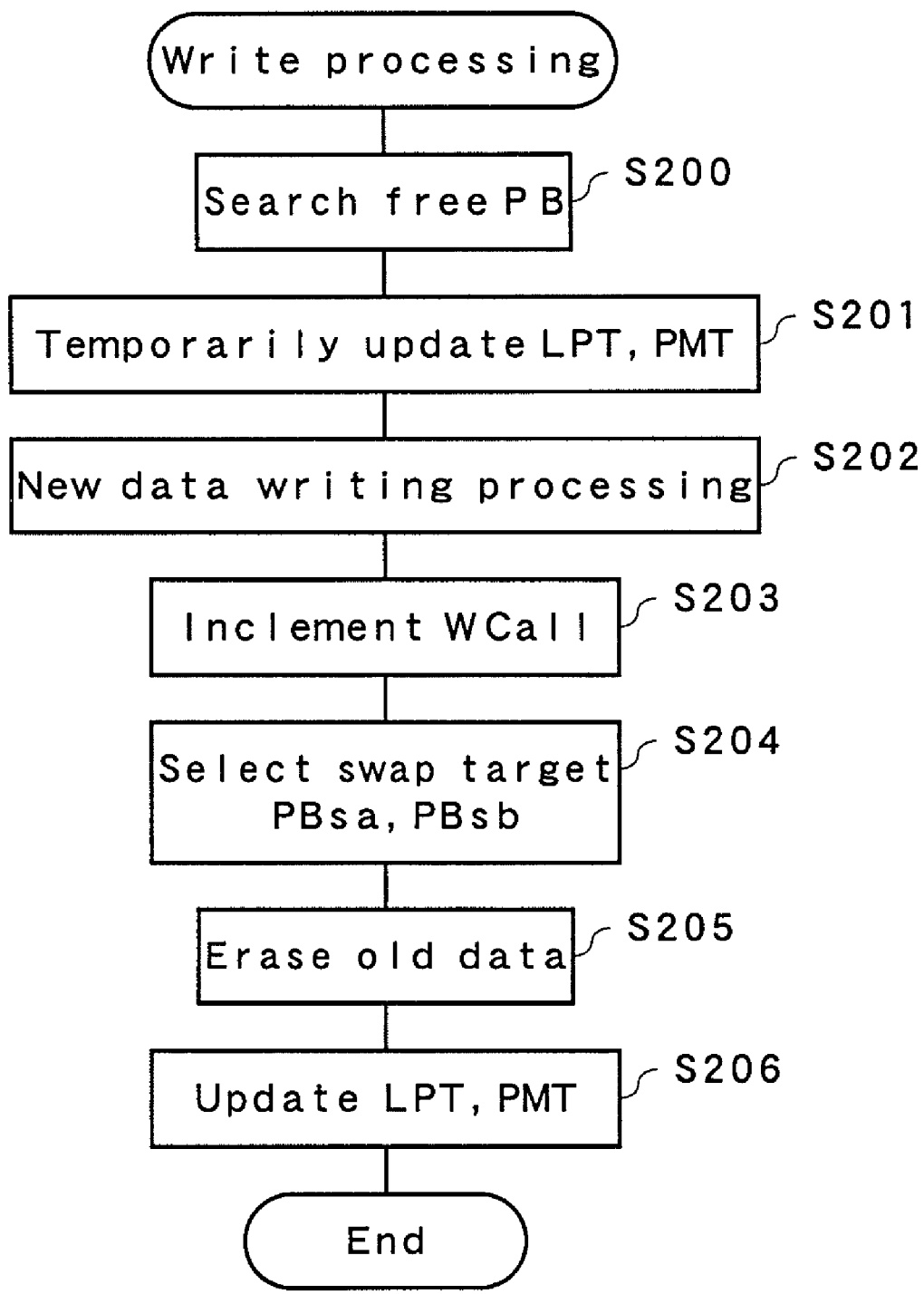
FIG. 9 is a flow chart showing writing processing.

At S202 in FIG. 9, the reading and writing control unit 127 transmits a write instruction to write new data in LB0 and writing destination block number (P−2) to the memory interface 123. The memory interface 123 starts to write data in LB0, which is temporarily stored in the buffer 122, to the PB (P−2) of the nonvolatile memory 110. The reading and writing control unit 127 performs processing at S203, S204 by the time that writing is completed.

At S203 in FIG. 9, the reading and writing control unit 127 reads the total number of times of rewriting WCall (current value) from the physical area management table 131 and holds WCall obtained by adding 1 to the WCall in the physical area management table 131 again as new WCall. At S204, the reading and writing control unit 127 selects the physical blocks PBsa and PBsb as the swap targets referring to the physical area management table 131 (S204). Specifically, among PBs having the value of the select completion flag S of 0 in the physical area management table 131, that is, "PBs which are not selected as the swap target", PBN and BST of PB having a maximum value of WC are held in the register 148 of the reading and writing control unit 127 and PBN and BST of PB having a minimum value of WC are held in the register 158 of the reading and writing control unit 127.

The maximum value of WC is detected by the acquisition circuit 127A of the reading and writing control unit 127. In FIG. 4, the physical area management table 131 sequentially reads WC, PBN and BST of PBN having the value of the S flag of 0 from the leading address of the physical area management table 131 in ascending order by the reading circuit 140 according to the system clock SCK. At start of reading, that is, at reading of PB0 in FIG. 4, the value of the START flag becomes 1 and the B inputs of the selector 142 and selector 144 are selected through the OR gate 141. In other words, WC (a+X+1) of PB0 is temporarily held in the register 145 and PBN (0) and BST (0) of PB0 are temporarily held in the register 143. According to the next SCK, the value of the START flag becomes 0, information on PB1 in the physical area management table 131 is read from the reading circuit 140 and the comparator 146 compares WC(a+X+1) of PB0 with WC(m) of PB1. Since the B input (m) is smaller than the A input (a+X+1), the comparison output becomes 0 and S inputs of the selector 142 and selector 144 through the OR gate 141 become 0. As a result, PBN and BST which are temporarily held in the register 143 are temporarily held in the register 143 again. Meanwhile, WC temporarily held in the register 145 is temporarily held in the register 145 again. When the above-mentioned operation is repeated from PB0 to PB (P−1), at the time when reading from PB (P−1) is finished, the value of the END flag becomes 1 and the register 148 holds PBN and BST which correspond to PB with the maximum number of times of rewriting therein. In other words, given that the maximum number of times of rewriting M is a+X+1, PB0 is selected as PBsa. The register 148 in FIG. 13A shows this state. When the value of the END flag becomes 1, the register 149 holds WC corresponding to the maximum number of times of rewriting of PB, that is, the maximum number of times of rewriting M therein.

The minimum value of WC is detected by the acquisition circuit 127B of the reading and writing control unit 127. The processing is basically similar to the processing by the acquisition circuit in FIG. 4 and a difference is that an output condition of the comparator 156 is B<A. Due to the difference, the register 158 of the acquisition circuit 127B holds PBN and BST corresponding to PB with the minimum number of times of rewriting therein. In other words, given that the minimum number of times of rewriting is m, PB1 is selected as PBsb. The register 158 in FIG. 13A holds the PBN and BST therein.

In FIG. 9, after writing of the new data is finished and the reading and writing control unit 127 selects PBsa and PBsb as the swap targets, the old data is erased (S205). In erasure of the old data, the reading and writing control unit 127 instructs the address management unit 125 to search PB which stores the old data in LB0. Referring to the logical-physical conversion table 132, the address management unit 125 informs PBN held in LB0, that is, PB0 as an erasure target block to the reading and writing control unit 127. After that, according to control by the reading and writing control unit 127, the memory interface 123 erases data in the physical block address PB0.

After processing up to S205 is finished, the reading and writing control unit 127 rewrites the physical area management table 131 and logical-physical conversion table 132, which are temporarily updated in the RAM of the address management unit 125 into a management area of the nonvolatile memory 110 through the memory interface 123 (S206). In this manner, the tables 131, 132 are updated. Then, the writing processing S103 shown in FIG. 8 finishes. FIG. 7B shows a state where writing finishes and the number of times of rewriting M to PB0 increases.

Figure 10:
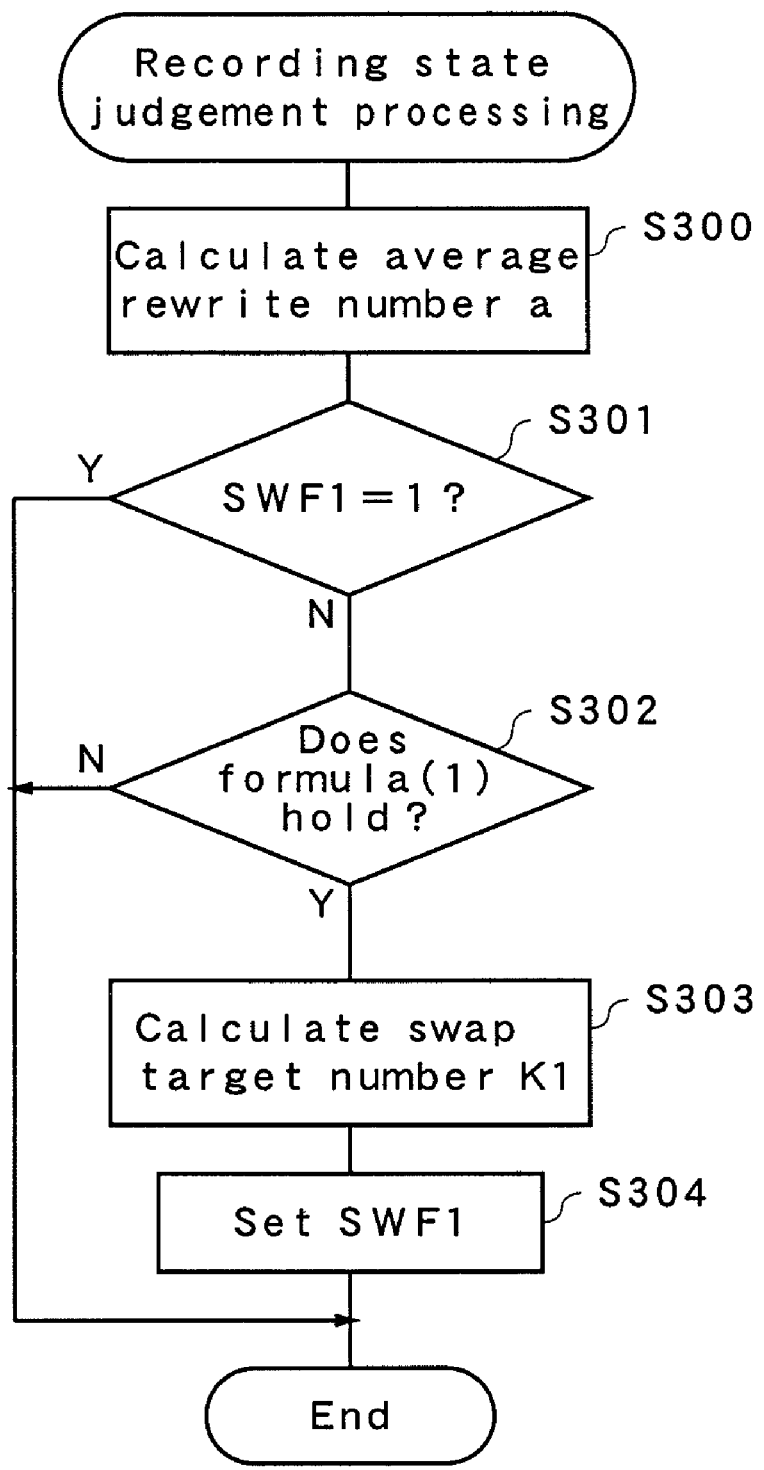
FIG. 10 is a flow chart showing recording state judgement processing.

Next, the procedure shifts to recording state judgement processing (S104). FIG. 10 is a flow chart showing details of the recording state judgement processing. First, the recording state judgement unit 126 calculates the average number of times of rewriting a according to a formula (3) (S300). Here, the recording state judgement unit 126 refers to WCall from the physical area management table 131. P is the total number of the physical blocks of the nonvolatile memory 110.

$$a = WCall/P \quad (3)$$

Given that P is 4096, it is preferred that WCall expressed in binary number is shifted to the right by 12 bits to calculate a. Since a is a parameter which permits a small margin or error, when P is not a power of 2, P may be approximately factored to a plurality of values of power of 2 to perform calculation by combination of shift operation and addition. Thereby, calculation load can be reduced.

After that, the recording state judgement unit 126 judges a swap necessity flag (hereinafter referred to SWF1) held therein (S301). In a case where the value of the flag is 1, processing is finished and when SWF1 is 0, the procedure proceeds to swap necessity judgement (S302). When the formula (1) holds at S302, the alternate area is localized. In this case, to suppress the alternate area localization, swap processing is performed. In the swap processing, first, the target number of times of swap K1 is calculated according to the formula (2) (S303), the value of the flag SWF1 is set to 1 and based on the swap necessity judgement result, a swap instruction is issued to the reading and writing control unit 127 (S304).

Here, in the recording state of the nonvolatile memory 110 shown in FIG. 3A, the number of PB with WC which is larger than the average number of times of rewriting a is three and the number of PB with WC which is smaller than the average number of times of rewriting a is 4093. Accordingly, the target number of times of swap K1 is three according to the formula (2) and the swap processing is performed three times.

Figure 11:
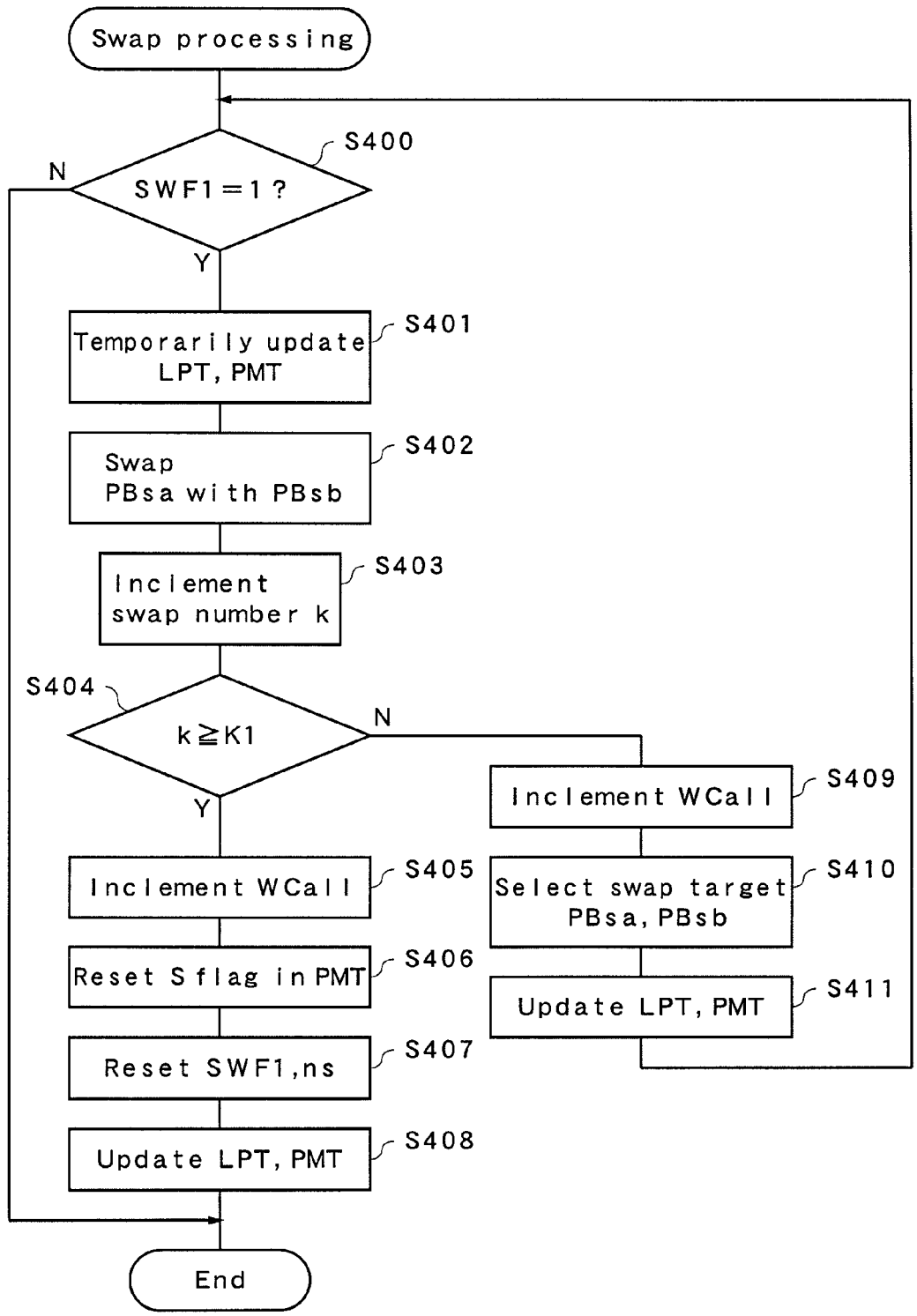
FIG. 11 is a flow chart showing swap processing.

Thus, the recording state judgement processing (S104) shown in FIG. 8 is finished and the procedure proceeds to the swap processing (S105). The reading and writing control unit 127 performs the swap processing according to the flow chart of FIG. 11. First, the reading and writing control unit 127 finished processing without performing the swap processing when the value of SWF1 received from the recording state judgement unit 126 is 0 and shifts to processing at S401 and subsequent processing when the value of SWF1 is 1.

Figure 14A:
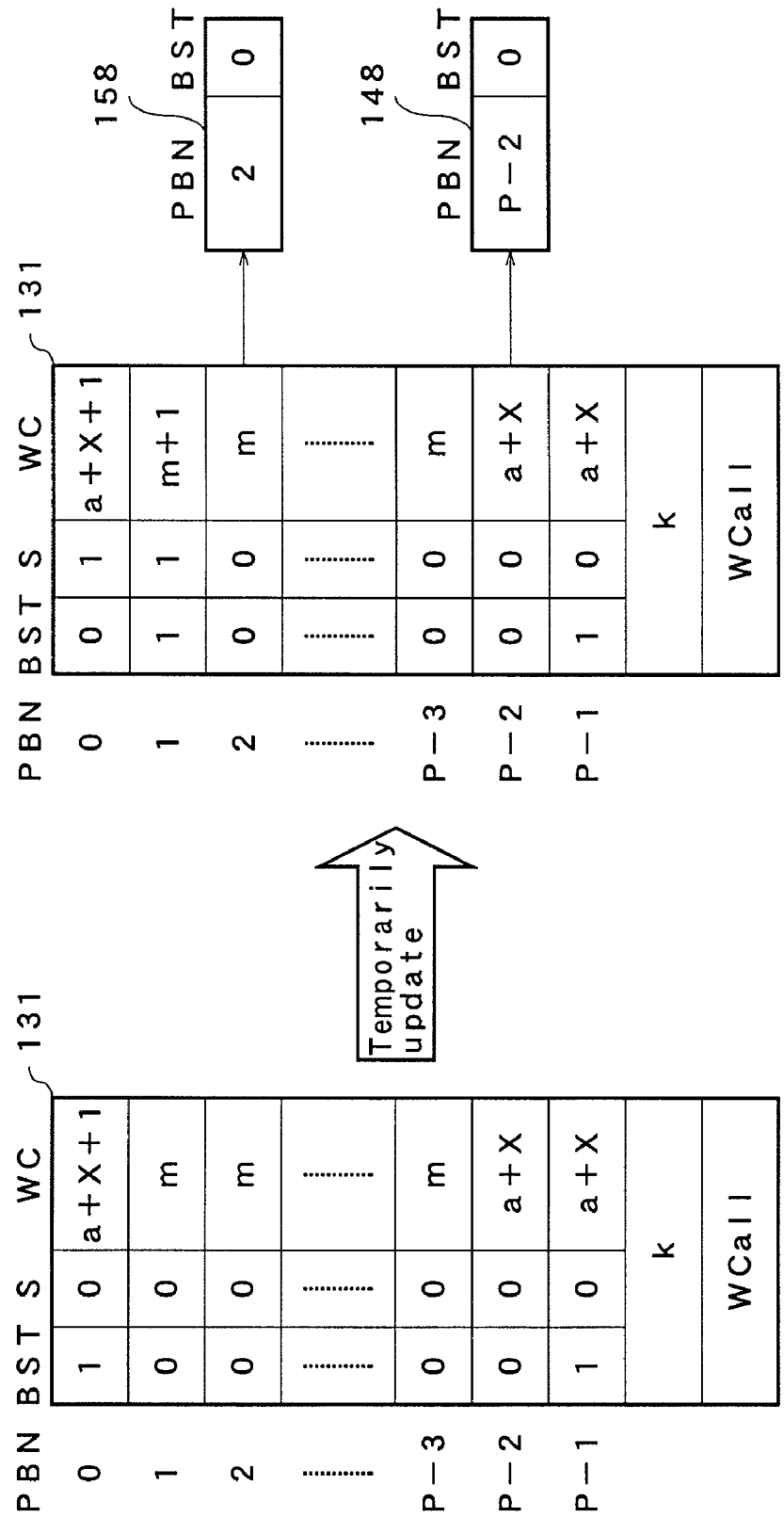
FIG. 14A is a memory map showing temporary update of the physical area management table 131 at the first swap.
Figure 14B:
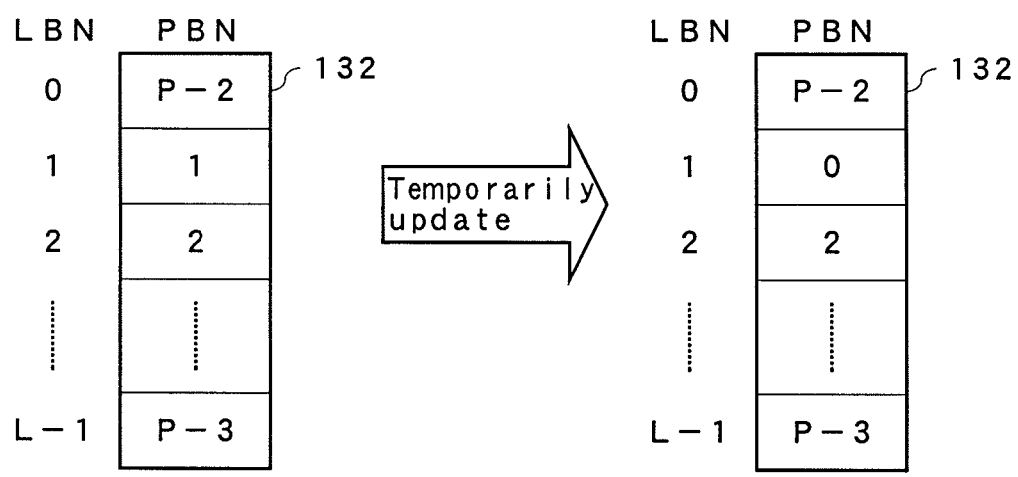
FIG. 14B is a memory map showing temporary update of the logical-physical conversion table 132 at the first swap.

FIG. 14A is a memory map showing temporary update of the physical area management table 131 at the first swap and FIG. 14B is a memory map showing temporary update of the logical-physical conversion table 132 at the first swap.

At S401, based on the information held in the registers 148, 158 shown in FIG. 13A, the reading and writing control unit 127 instructs the address management unit 125 to temporarily update BSTs and S flags of PB0 and PB1 as the swap targets in the physical area management table 131. The reading and writing control unit 127 also instructs the address management unit 125 to temporarily update PBN corresponding to the logical block LB0 as the swap target in the logical-physical conversion table 132. As a result, physical area management table 131 is temporarily updated as shown in FIG. 14A and the logical-physical conversion table 132 is temporarily updated as shown in FIG. 14B.

After that, at S402, referring to the register 148 and register 158, the reading and writing control unit 127 determines a swap procedure so as to issue a swap instruction of PBsa and PBsb. Here, PB0 as the free PB is swapped with PB1 as the used PB as shown in FIG. 7C, a procedure corresponding to following steps 1 to 3 is informed to the memory interface 123.

Step 1: Reading of data in LB1 from PB1
Step 2: Writing of the read data in LB1 to PB0
Step 3: Erasure of PB1

Based on this, the memory interface 123 starts the swap processing.

Figure 7C:
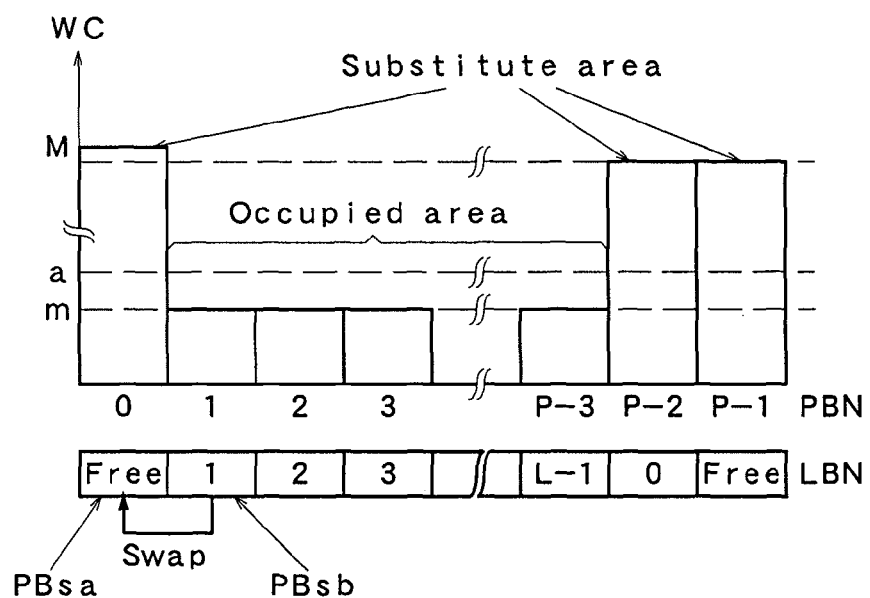
FIG. 7C is an explanatory view showing a recording state before swap.
Figure 7D:
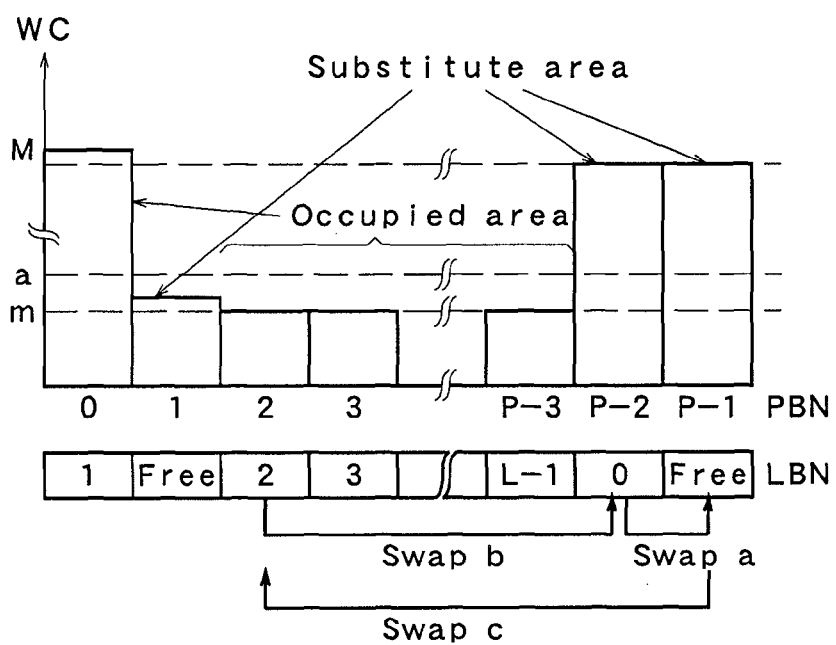
FIG. 7D is an explanatory view showing a recording state after a first swap.

By performing the steps 1 to 3 in this manner, the recording state in FIG. 7C is changed to the recording state in FIG. 7D. In other words, data in LB1 is written to PB0 and PB1 becomes a free PB.

During the swap processing is performed, the reading and writing control unit 127 reads the number of times of swap k held in the physical area management table 131 and increments k (S403) and then, compares k with the target number of times of swap K1 (S404). When k does not reach K1, that is, swap needs to be continued, the number of times of rewriting of PB1 increases by 1 by erasure of PB1 in the swap processing currently performed. Accordingly, the reading and writing control unit 127 reads WCall (current value) from the physical area management table 131 and holds WCall obtained by adding 1 to the WCall in the physical area management table 131 as new WCall again (S409).

Furthermore, as in the above-mentioned processing at S204, the reading and writing control unit selects the next swap targets PBsa and PBsb and as shown in FIG. 14A, holds PBN and BST of PB(P−2) in the register 148 and PBN and BST of PB2 in the register 158 (S410). After that, at S411, the reading and writing control unit 127 rewrites the physical area management table 131 and logical-physical conversion table 132 to the nonvolatile memory 110 through the memory interface 123 and the procedure returns to S400.

Then, swap-related processing at S400 and subsequent steps is performed. Here, since both PB2 and PB (P−2) are used PB, the swap processing is performed by using a free PB, for example, PB (P−1) as an intermediate buffer. In such case, three-staged processing of swap a, b, c as shown in FIG. 7D is required. Accordingly, the recording state of the nonvolatile memory 110 in FIG. 7D is changed to that in FIG. 7E and the number of times of rewriting increases by 2PB of PB (P−2) and PB (P−1). According to following rules, WCall changes depending on the way of swap.

(1) When both the swap targets are free PBs, WCall increases by 0.
(2) When one swap target is a free PB and the other swap target is a used PB, WCall increases by 1.
(3) When both the swap targets are used PBs, WCall increases by 2.

Figure 7E:
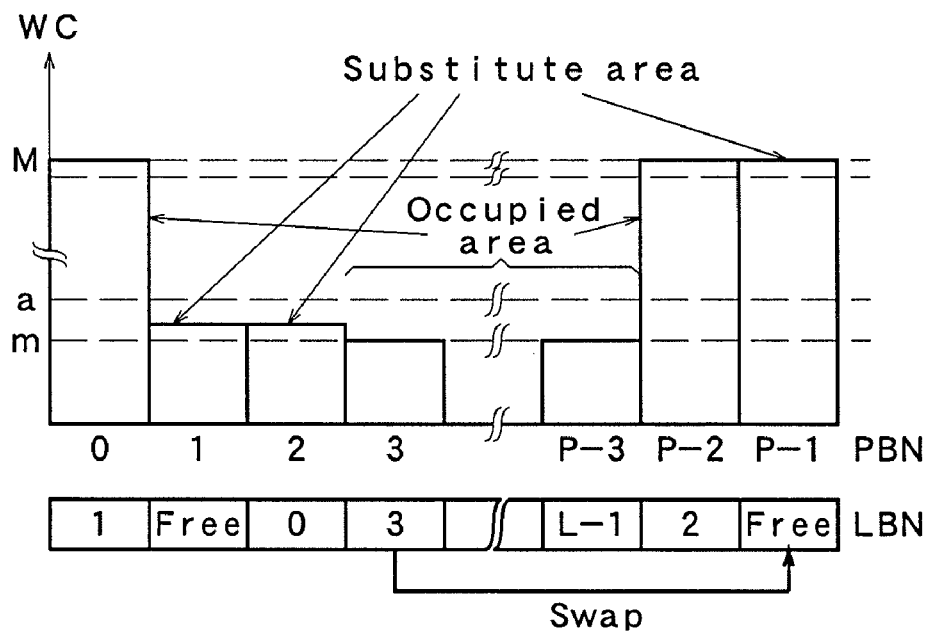
FIG. 7E is an explanatory view showing a recording state after a second swap.
Figure 7F:
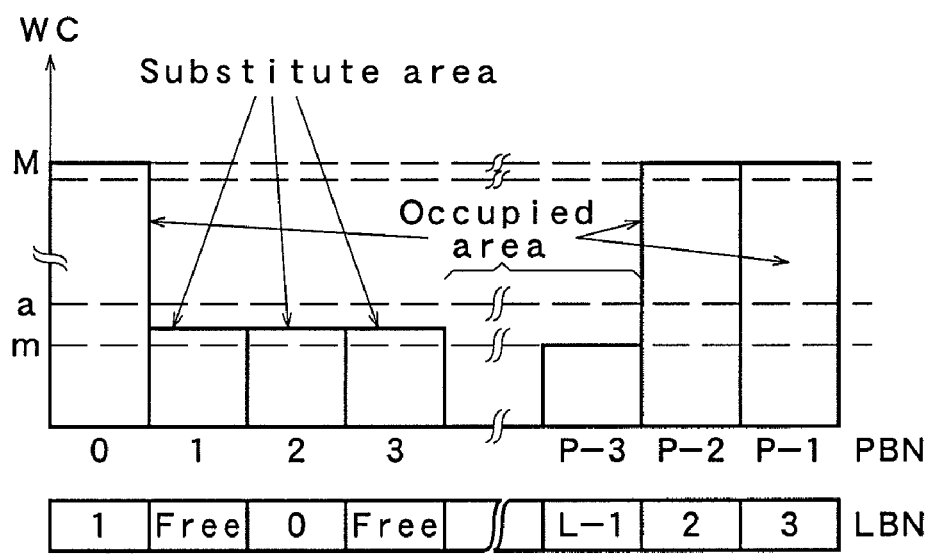
FIG. 7F is an explanatory view showing a recording state after the third (last) swap.

In the present embodiment, swap (1) is impossible. When the reading and writing control unit 127 performs the swap-related processing K1 times (three times), as shown in FIG. 7F, all alternate areas are replaced with the occupied areas and then, the procedure shifts from S404 to S405.

At S405, the number of times of rewriting of PB3 increases by 1 by the third swap processing and therefore, the reading and writing control unit 127 adds 1 to WCall and resets all S flags in the physical area management table 131 (S406). After SWF1 and the number of times of swap k are reset (S407), the reading and writing control unit 127 rewrites the physical area management table 131 and logical-physical conversion table 132 to the nonvolatile memory 110 (S408) and completes the swap processing.

Figure 12:
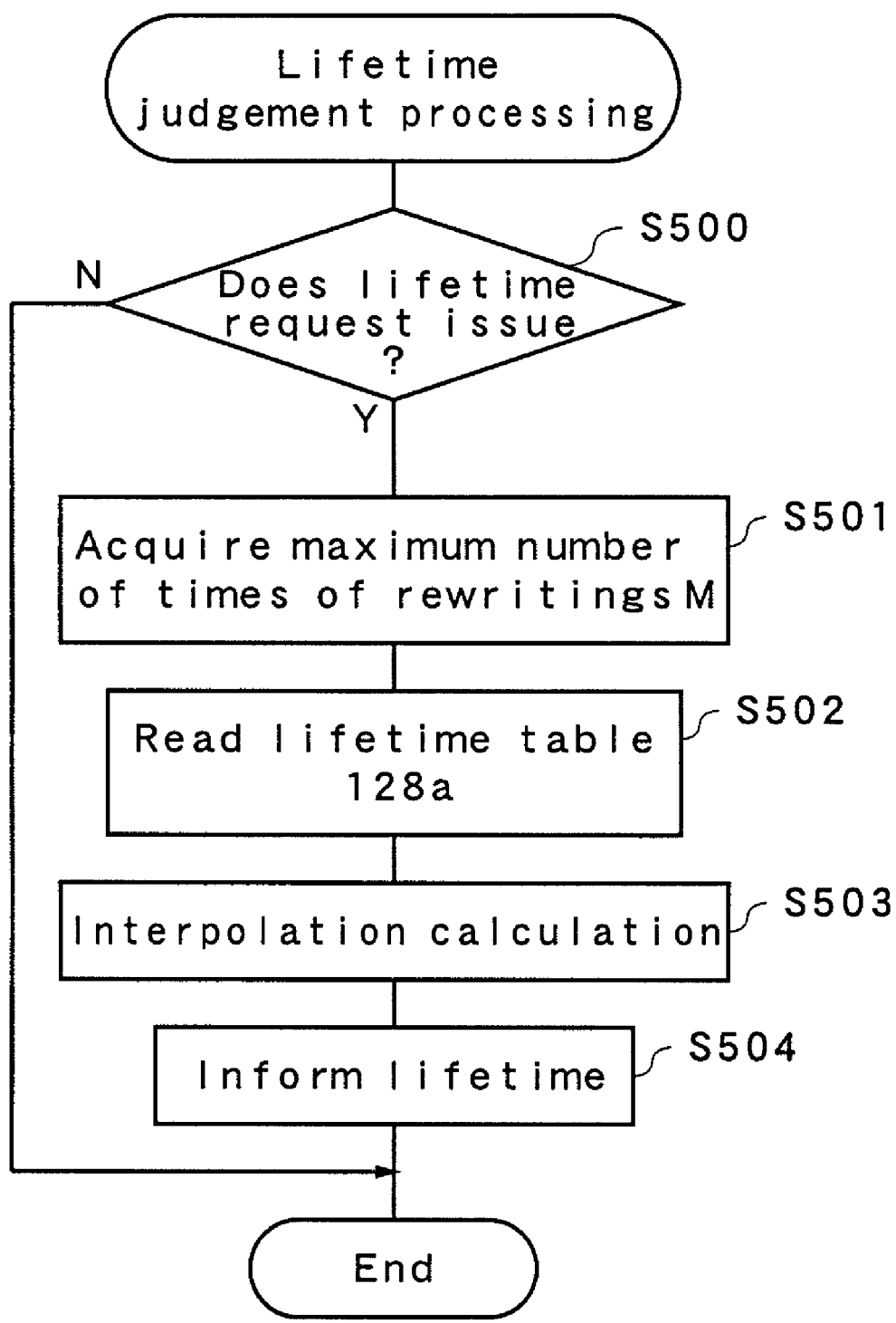
FIG. 12 is a flow chart showing lifetime judgement processing.

Finally, operation of the lifetime judgement unit 128 will be described. When the access module 200A issues a lifetime request command to the nonvolatile storage module 100A, in the flow chart of FIG. 8 showing overall processing, the procedure proceeds to S106 and the lifetime judgement unit 128 performs lifetime judgement processing according to the flow chart of FIG. 12. When the host interface 121 receives the lifetime request command, the host interface 121 informs the reception to the lifetime judgement unit 128 and the lifetime judgement unit 128 performs judgement at S500 and then, instructs the reading and writing control unit 127 to acquire the maximum number of times of rewriting M.

The reading and writing control unit 127 holds the maximum number of times of rewriting M in the register 149 by the processing by the acquisition circuit 127A of the above-mentioned processing at S204 and outputs the END flag to the lifetime judgement unit 128. When the lifetime judgement unit 128 receives the END flag, the lifetime judgement unit 128 acquires the maximum number of times of rewriting M held in the register 149 (S501) and reads the lifetime table 128a shown in FIG. 6 (S502). In reading, the lifetime judgement unit 128 determines two values which are the closest to the maximum number of times of rewriting M in the number of times of rewriting WC on the lifetime table 128a. Given that WC which is smaller than M is WC1 and WC which is larger than M is WC2, data retention times r (WC1) and r (WC2) which correspond to WC1 and WC2, respectively, are read (S502). For example, in a case where M is 180, WC1 is 100, WC2 is 200, r (WC1) is 501187 and r (WC2) is 116906. Dimension of r is hour.

After that, interpolation calculation is performed according to a formula (4) (S503).

$$r(M)=r(w1)+\alpha\{r(w2)-r(w1)\} \quad (4)$$

Where, $\alpha=(M-w1)/(w2-w1)$

For example, when M is 180, r (M) becomes 193762 (hours). A lifetime judgement block 28 informs r (M) as a calculation result to the access module 200A through the host interface 121 as lifetime information (S504).

When the access module 200A receives r (M), the lifetime information display unit 201 displays r (M). Since the value of r (M) is large in a case where M is 180, dimension may be changed to year in display. In the present embodiment, the nonvolatile storage module 100A informs the lifetime information in response to the lifetime request command from the access module 200A. Alternately, the nonvolatile storage module 100A may appropriately make an interrupt to the access module 200A and inform the lifetime information.

As described above, in the nonvolatile storage system in the first embodiment, based on determination of the writing destination PB by selection of the free PB by the address management unit 125, that is, wear leveling by the alternate processing, the recording state judgement 126 performs swap necessity judgement according to the formula (1), that is, depending on the recording state, and the reading and writing control unit 127 determines the swap target blocks (PBsa, PBsb) according to the swap necessity judgement and performs swap. Thereby, "localization of alternate area" is suppressed and it is prevented that old data cannot be reproduced due to the "power disconnection problem".

Since the lifetime judgement unit 128 finds the data retention time and informs it to the access module 200A, the user recognizes the lifetime of the nonvolatile storage module and can record data in ease. Through swap, the alternate area localization is suppressed and the number of times of rewriting of PB in the nonvolatile memory 110 is leveled. Therefore, the data retention time corresponding to the maximum number of times of rewriting M or the average number of times of rewriting a, that is, the lifetime information informed to the access module 200A can be regarded as the data retention time of any record information in the nonvolatile memory 110. In other words, the lifetime information can be regarded as the lifetime of the nonvolatile storage module.

Although the recording state judgement unit detects the alternate area localization based on the maximum value and average value of the number of times of rewriting in the first embodiment, the recording state judgement unit may detect the alternate area localization based on the other values such as the maximum value and minimum value of the number of times of rewriting. Furthermore, although the reading and writing control unit determines the swap target areas based on the number of times of rewriting, the swap target areas may be determined depending on whether or not the physical block is a free block along with the number of times of rewriting. When one of the physical blocks as the swap targets is limited to a free block, the three-staged processing shown in FIG. 7D becomes unnecessary and therefore, swap is finished through one processing as shown in FIG. 7C or 7E.

Furthermore, by using only a physical block having a number of times of rewriting close to its maximum value, and a physical block having a number of times of rewriting close to its minimum value, as the swap target area, the number of times of swap may be reduced.

Second Embodiment

Figure 15:
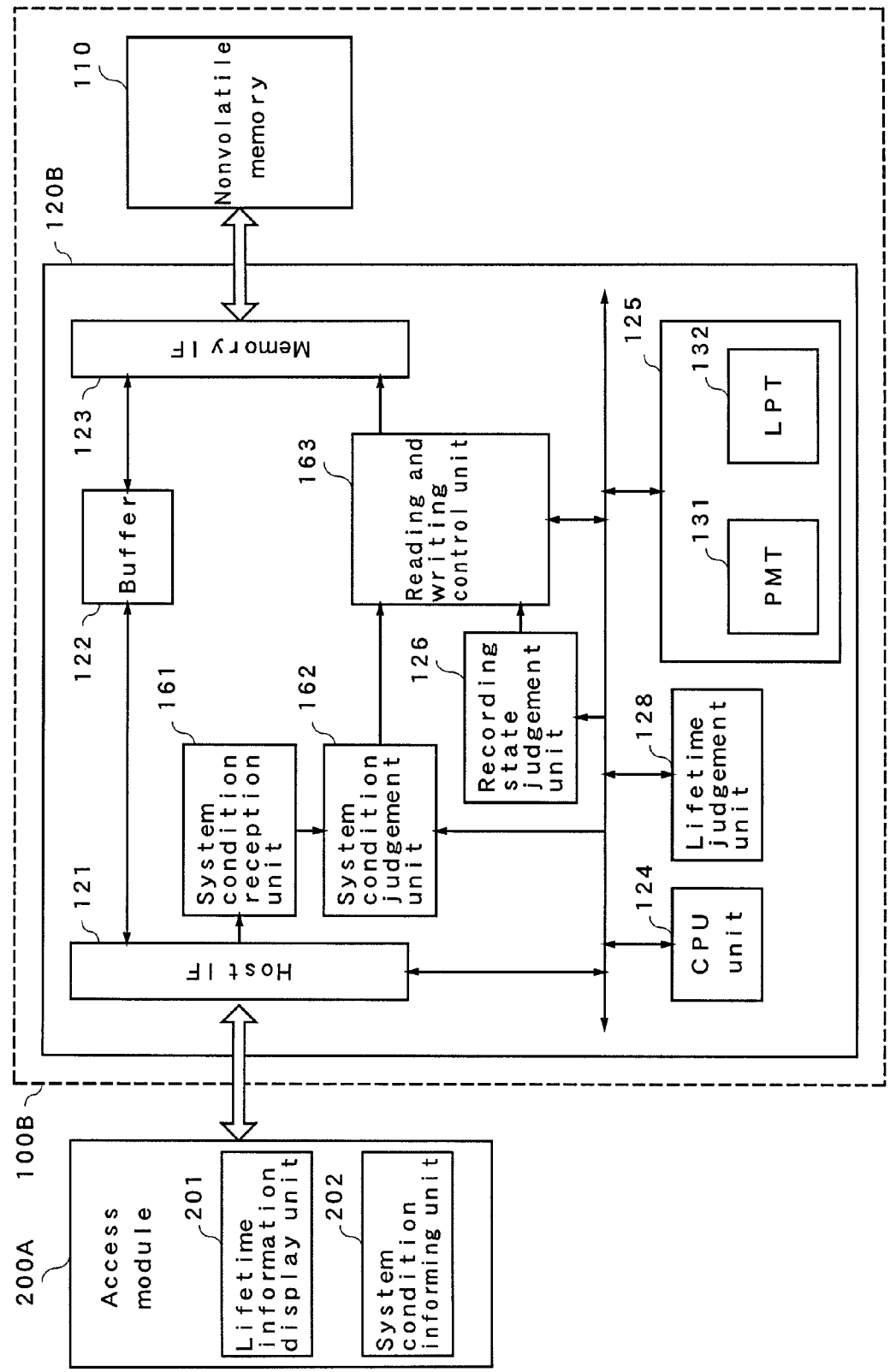
FIG. 15 is a block diagram showing a nonvolatile storage system in accordance with a second embodiment of the present invention.

FIG. 15 is a block diagram showing a nonvolatile storage system in accordance with a second embodiment of the present invention. In FIG. 15, the nonvolatile storage system includes a nonvolatile storage module 100B and access module 200B. The access module 200B is obtained by adding a system condition informing unit 202 to the access module in the first embodiment. The nonvolatile storage module 100B includes a memory controller 120B and nonvolatile memory 110. The memory controller 120B is obtained by adding a system condition reception unit 161 and system condition judgement unit 162 to the memory controller 120A in the first embodiment. The reading and writing control unit 163 is a modification of the reading and writing control unit 127 in the first embodiment. The other blocks are similar to those in the nonvolatile storage module in the first embodiment in FIG. 1.

Figure 16:
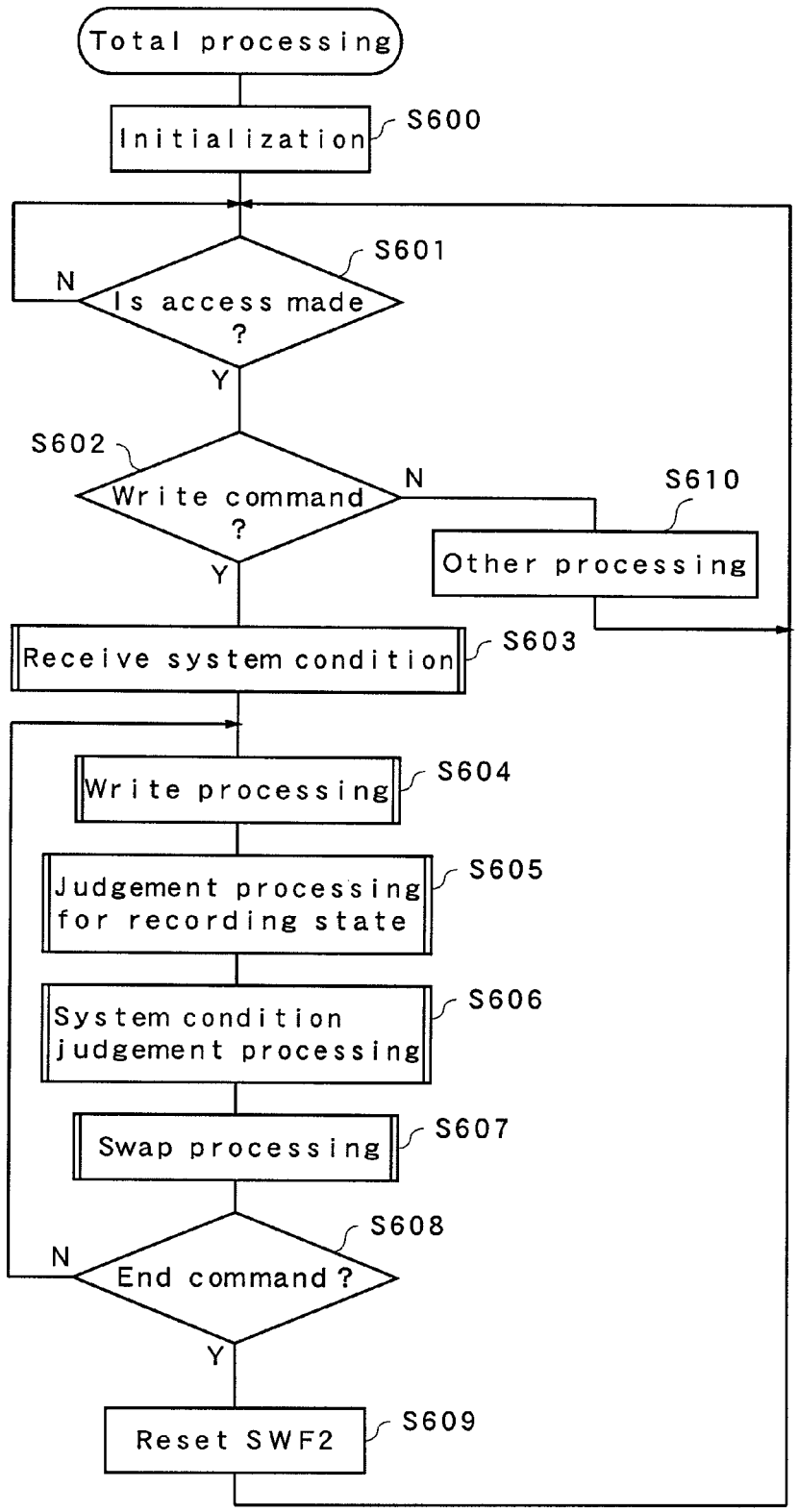
FIG. 16 is a flow chart showing overall processing by a nonvolatile storage module 100B in accordance with the second embodiment of the present invention.
Figure 17:
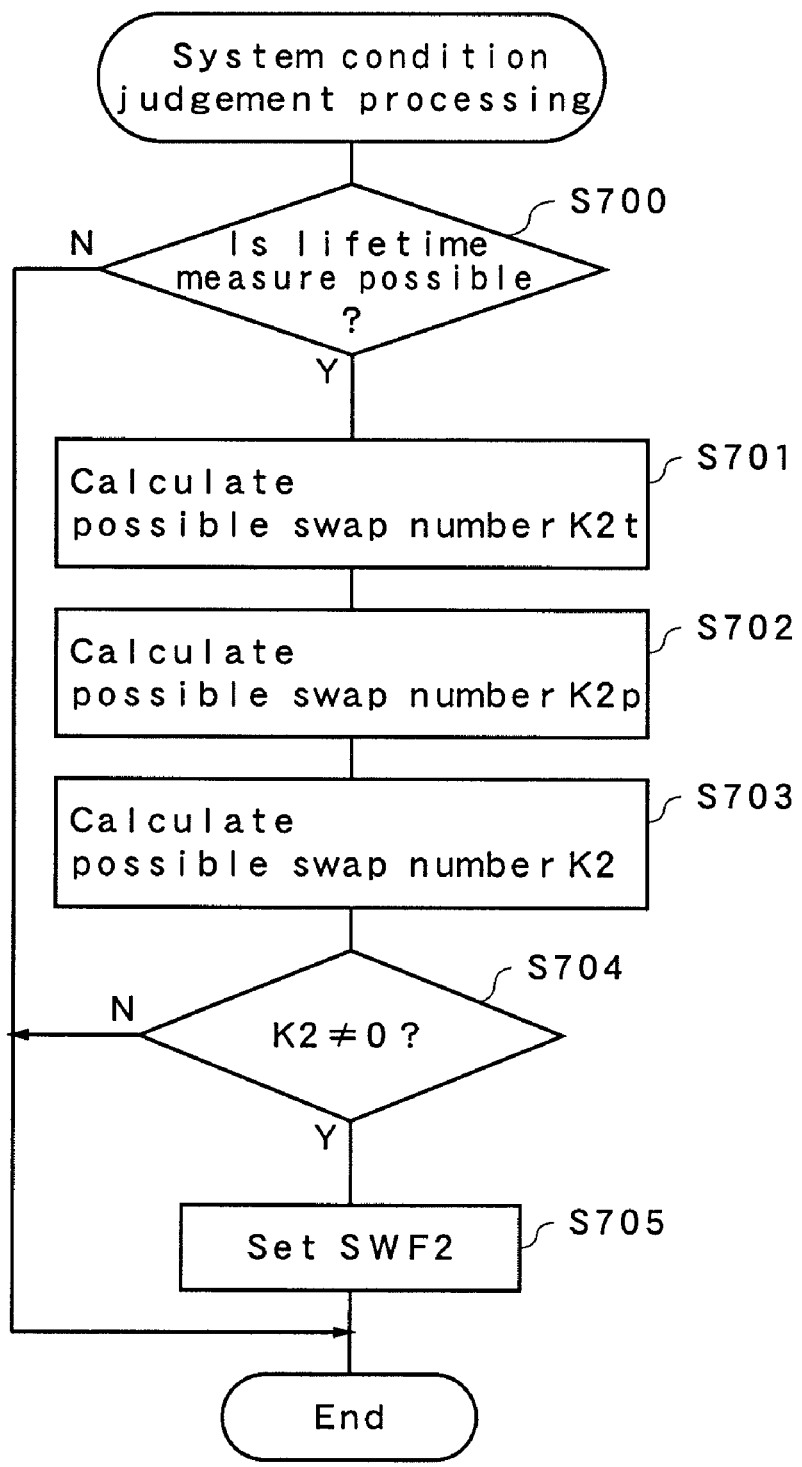
FIG. 17 is a flow chart showing system condition judgement processing.
Figure 18:
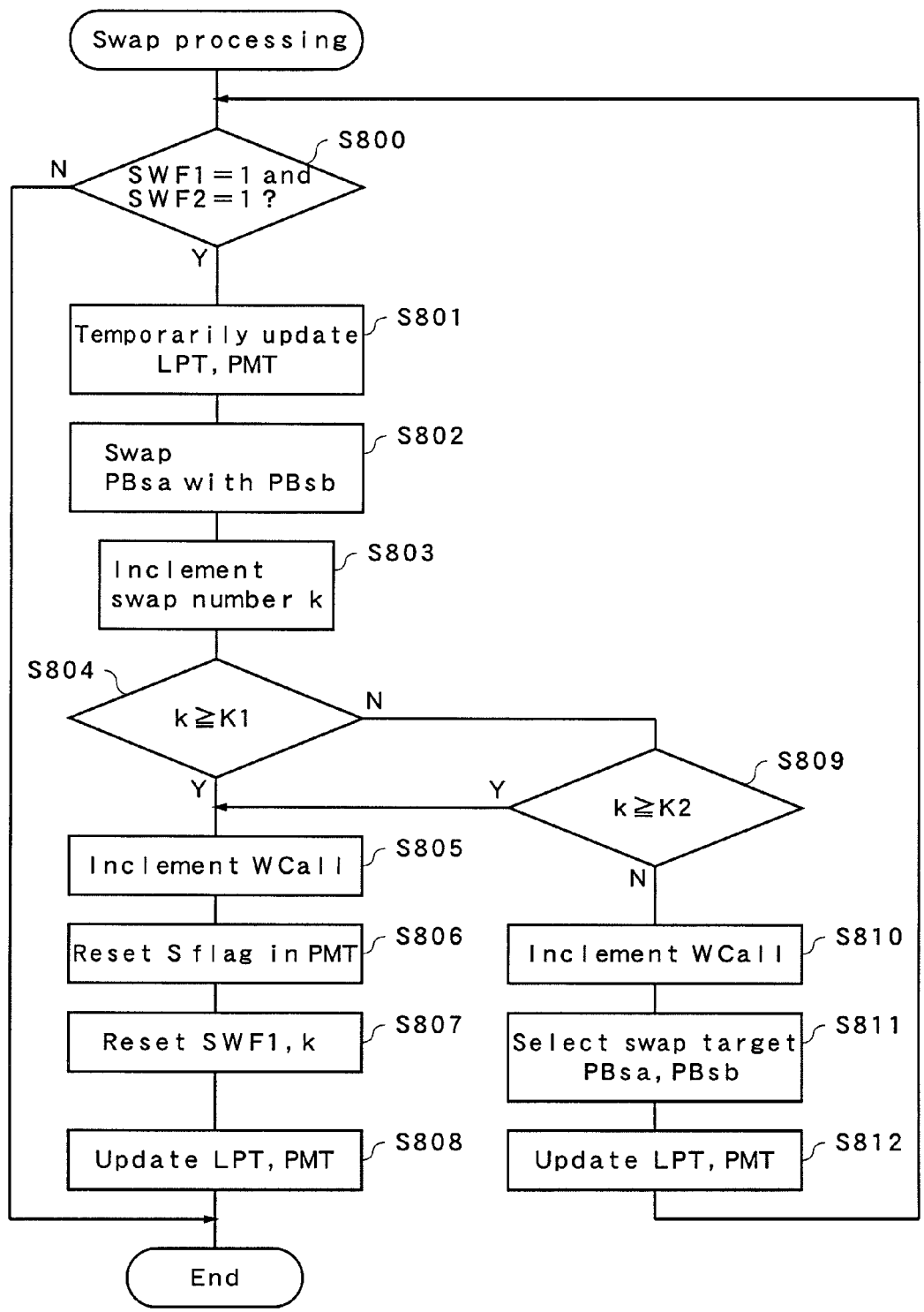
FIG. 18 is a flow chart showing swap processing.
Figure 19:
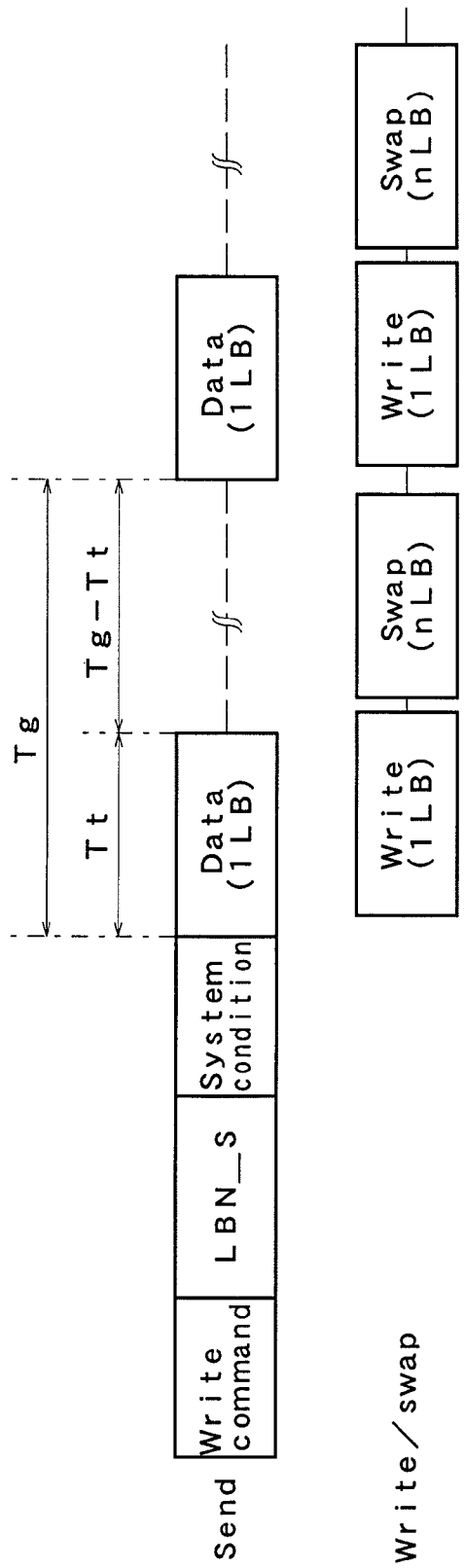
FIG. 19 is a time chart showing writing processing.

Operation of the nonvolatile storage system thus configured in accordance with the second embodiment of the present invention will be described. FIG. 16 is a flow chart showing overall processing in the second embodiment of the present invention, FIG. 17 is a flow chart showing system condition judgement processing, FIG. 18 is a flow chart showing swap processing and FIG. 19 is a time chart showing writing processing.

A basic operation is similar to that of the nonvolatile storage system in the first embodiment and a difference in that it is judged whether or not the swap processing can be performed in a scope which satisfies system conditions such as writing speed or power received from the access module 200B, and in a case where the swap processing is possible how much swap processing can be performed. Then, the swap processing is performed based on the swap possibility judgement.

In the overall processing shown in FIG. 16, first, the module performs the initialization processing and waits an access from the access module 200B. Here, it is assumed an access from the access module 200B is made and the write command is issued (S602). In data writing, as shown in FIG. 19, the access module 200B transmits the write command, start logical block number (LBN_S) as an argument of the command and system conditions. The system condition reception unit 161 receives the system conditions through the host interface 121 (S603). After that, data is intermittently transmitted every one logical block (hereinafter referred to as 1 LB). The access module 200B transmits a termination command not shown at the time when a necessary amount of data is transmitted and terminates the writing processing.

FIG. 20 shows an example of the system conditions. In the present embodiment, the system conditions include three conditions: a basic condition, speed condition and power condition. The basic condition is a flag representing possibility of a lifetime measure, and in a case where the value of the flag is 0, the lifetime measure is forcedly prohibited in despite of the speed condition and power condition. When the value of the flag is 1, the lifetime measure is made available. In this case, the nonvolatile storage module 100B judges possibility of the swap processing by the reading and writing control unit 163 and so on according to their capabilities in response to the speed condition and power condition described later.

The speed condition is a condition relating to a guarantee speed of writing data to the nonvolatile storage module 100B and writing must be performed in the scope which satisfies the speed condition. Tg in the speed condition represents a transmission time interval in units of 1 LB. In the example of the system conditions in FIG. 20, data of 1 LB is transmitted every second. Given that the capacity of 1 LB is 1 MByte, a necessary transmission rate is 1 MByte/second. Tt represents a time during which data of 1 LB is actually transmitted. In other words, Tg−Tt represents a time during which data is not transmitted.

The power condition is a condition relating to an allowable power Pa (maximum power) which can be fed to the nonvolatile storage module 100B and at least writing must be performed in the scope which satisfies this power condition.

After the system conditions are received at S603, the procedure shifts to a series of processing from writing to swap at S604 and subsequent steps. In the series of processing from writing to swap, the memory controller 120B performs writing processing and recording state judgement processing at S604 and S605 as in S103, S104 in the first embodiment, and then, the system condition judgement unit 162 performs the system condition judgement processing (S606).

FIG. 17 shows the system condition judgement processing, in which the judgement unit judges whether or not the value of a lifetime measure possibility flag is 1, which represents a basic condition (S700). If the value of the flag is 0, the judgement unit finishes the judgement processing. When the value of the flag is 1, the procedure proceeds to S701, S702 and the judgement unit calculates the possible number of times of swap K2$t$ based on the speed condition and the possible number of times of swap K2$p$ based on the power condition.

Based on the speed conditions Tg, Tt and time Ts required to perform swap per 1 LB, the system condition judgement unit 162 calculates K2$t$ according to a formula (5).

$$K2t = int\{(Tg-Tt)/Ts\} \tag{5}$$

Where, int is a function taking an integral value. However, since these values vary depending on the way of swap as described above, in calculation of the formula (5), the system condition judgement unit 162 receives swap type information from the reading and writing control unit 163 and then, determines Ts.

Based on the power condition Pa and power Ps required to perform swap per 1 LB, the system condition judgement unit 162 calculates K2P according to a formula (6).

$$K2p = int(Pa/Ps) \quad (6)$$

After S702, the system condition judgement unit 162 calculates the possible number of times of swap K2 according to a formula (7) (S703). Where, MIN is a function taking a minimum value.

$$K2 = MIN(K2t, K2p) \quad (7)$$

After that, when k2 is not 0 (S704), the system condition judgement unit 162 sets the value of a swap possibility flag SWF2 to 1 (S705) and terminates processing.

Following the above-mentioned system condition judgement processing (S606), at S607, the swap processing is performed. The swap processing in FIG. 18 is substantially similar to the above-mentioned swap processing in FIG. 11. Differences are as follows: it is judged whether or not both the swap necessity flag SWF1 and swap possibility flag SWF2 are set at S800, and after S804, the number of times of swap k is compared with the possible number of times of swap K2 (S809). As a result of the comparison judgement, when k does not reach K2, there is a room to perform swap, and thus, the procedure shifts to S810 and continues the swap processing. As a result of the comparison judgement, when k reaches K2, there is no room to perform swap, and thus, the procedure shifts to S805 and terminates the swap processing.

The above-mentioned processing is performed until the end command is transmitted (S608), and after reception of the end command, the value of the swap possibility flag SWF2 is reset to 0 and the next access is waited (S609).

As described, in the second embodiment, in addition to "swap necessity judgement based on the recording state" in the first embodiment, "swap possibility judgement based on the system conditions" is performed. Thus, it is possible to reduce overheads of speed and power, and to solve, for example, the system problem that contents requiring real-time storage, such as moving images, cannot be recorded.

Although the system condition is received as the argument of the write command, a command dedicated to inform the system condition may be used. Furthermore, the nonvolatile storage module 100B may provide a switch and may switch the possibility of the lifetime measure and so on as the basic condition shown in FIG. 20 by the operation of the switch.

Although K2s and K2p are calculated according to the formula (5) and formula (6) in the present embodiment, the nonvolatile storage module 100B may be provided with tables showing relationship between the speed condition and the number of times of swap K2s, and between the power condition and the number of times of swap K2p, respectively, and determine the values of K2s and K2p by referring to these tables when the system conditions are given.

Third Embodiment

Figure 21:
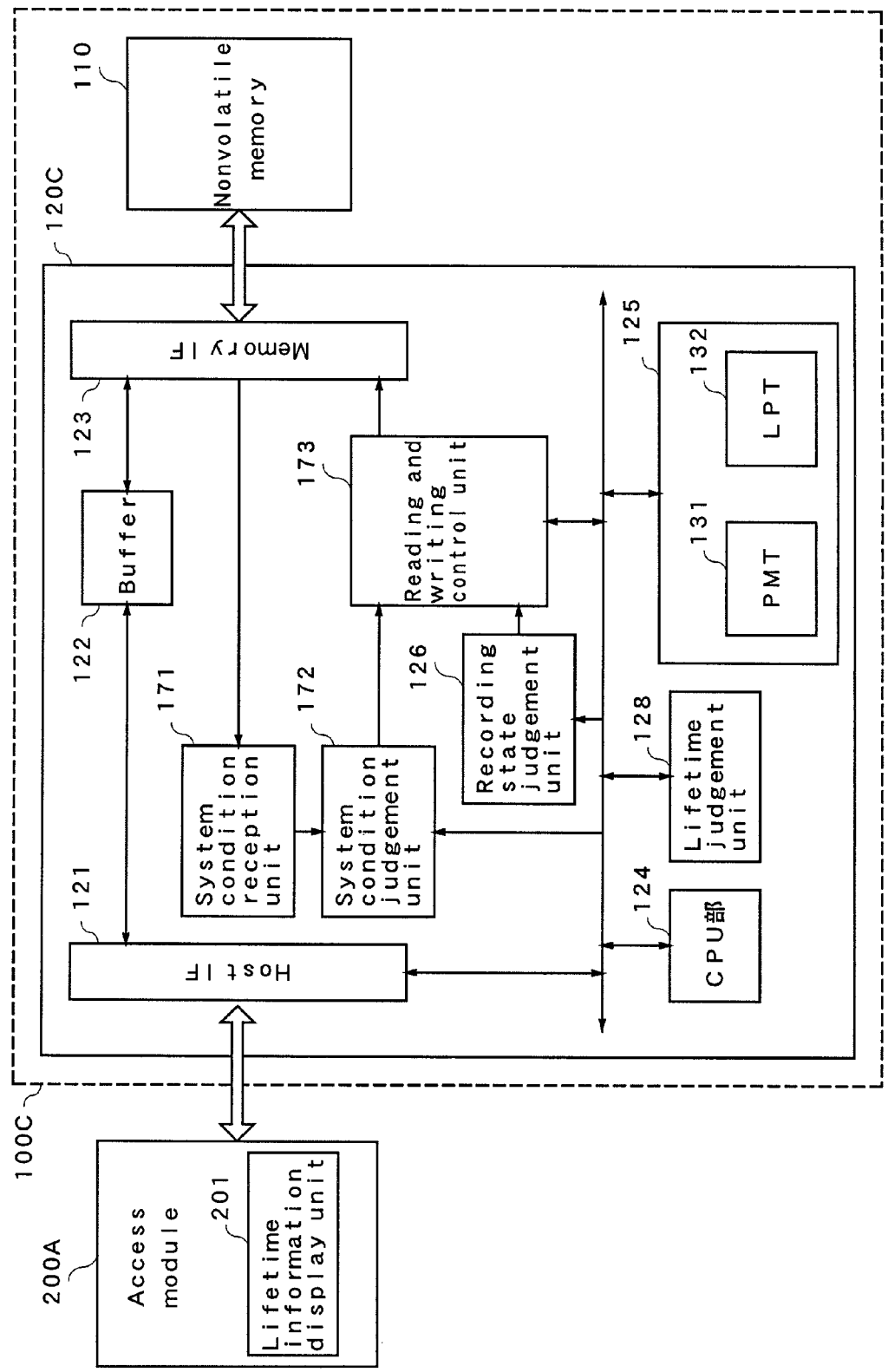
FIG. 21 is a block diagram showing a nonvolatile storage system in accordance with a third embodiment of the present invention.

FIG. 21 is a block diagram showing a nonvolatile storage system in accordance with a third embodiment of the present invention. The nonvolatile storage system includes a nonvolatile storage module 100C and an access module 200A. The access module 200A is same as the access module in the first embodiment. The nonvolatile storage module 100C includes a system condition reception unit 171, system condition judgement unit 172 and reading and writing control unit 173, and the other blocks are similar to those in the nonvolatile storage system in the second embodiment shown in FIG. 15.

Operation of the nonvolatile storage system thus configured in accordance with the third embodiment of the present invention will be described. FIG. 22 is a flow chart showing processing by the nonvolatile storage module 100C in accordance with the third embodiment of the present invention. A basic operation of the nonvolatile storage system is similar to that of the nonvolatile storage system in the second embodiment and a difference is that the system condition judgement unit 172 judges the lifetime measure based on an ID code representing the type of the nonvolatile memory.

In initialization processing (S900) shown in FIG. 22, the reading and writing control unit 173 reads the ID code from the nonvolatile memory 110 through the memory interface 123 and the system condition reception unit 171 receives the ID code. The ID code is information on the type of the nonvolatile memory 110, which is previously held in the ROM or the like in the nonvolatile memory 110, and represents that the nonvolatile memory is a highly reliable nonvolatile memory (for example, binary NAND flash memory) or low reliable nonvolatile memory (for example, multi-level NAND flash memory).

The module waits an access from the access module 200A. When there is an access, the procedure proceeds from step S901 to S902 and it is judged whether or not a command is the write command. If the command is the write command, the procedure proceeds to S903 and the writing processing and recording state judgement processing are performed. Recording processing (S903) and recording state judgement processing (S904) are same as the processing in FIG. 9 and the processing in FIG. 10, respectively. When the recording state is judged, the system condition judgement processing is performed. The system condition judgement unit 172 interprets the ID code received by the system condition reception unit 171 as a judgement reference in judgement of the lifetime measure. Specifically, in a case of the ID code value representing the highly reliable nonvolatile memory, it is judged that a reliability measure by the swap processing is unnecessary and the system condition judgement processing is finished. In the case of the ID code value representing the low reliable nonvolatile memory, it is judged that the lifetime measure is available (S905). When the lifetime measure is unavailable, the processing is finished and when the lifetime measure is available, the procedure proceeds to S906 and the flag SWF2 is set, and then, the procedure proceeds to S907 to perform the swap processing.

Figure 23:
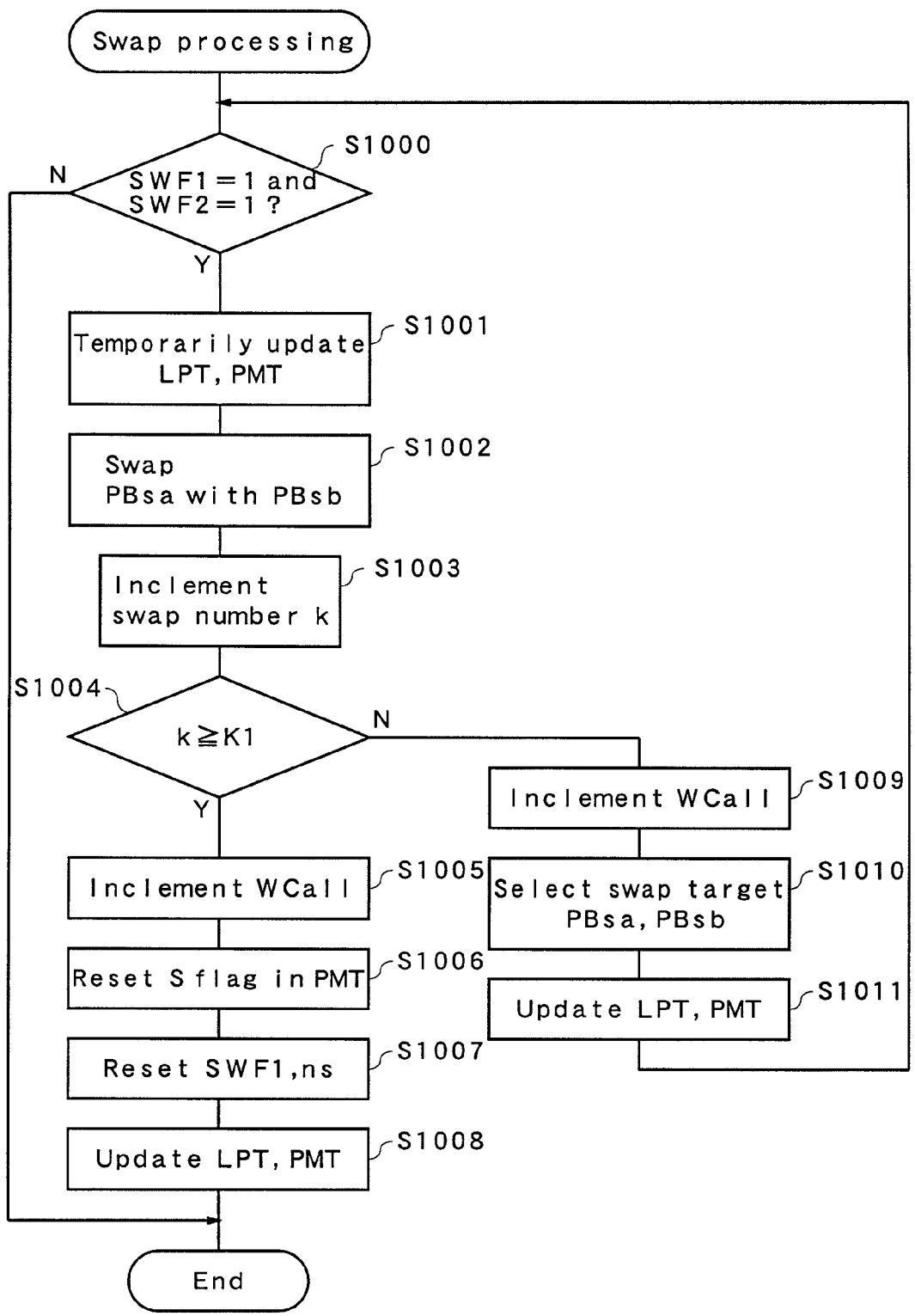
FIG. 23 is a flow chart showing swap processing in accordance with the third embodiment.

FIG. 23 is a flow chart showing swap processing in accordance with the third embodiment. When swap is started, first, at S1000, it is judged whether or not both the values of the flags SWF1 and SWF2 are 1. When the values are not 1, the processing is finished and when the values are 1, the procedure proceeds to S1001. Concerning subsequent processing, as in the first embodiment shown in FIG. 11, the swap processing is performed.

As described above, since the system condition judgement unit 171 performs the swap possibility judgement based on the ID code of the nonvolatile memory 110, that is, the reliability of the nonvolatile memory 110, useless swap processing need not be performed, enabling reduction of overheads of power and speed for the swap processing.

A memory card ID code for identifying the type of the nonvolatile storage module may be used as the ID code. In this case, the type of the nonvolatile storage module 100C is previously written to a part of the recording area of the nonvolatile memory 110 by the manufacturer, and the system condition judgement unit 172 performs the swap possibility judgement based on the memory card ID code in the initialization processing.

The memory card ID code is a code representing that the memory card is a RAM-type memory card or WOM-type memory card, that is, the memory card to which data can be written only once. The system condition judgement unit 172 interprets the memory card ID code read from the nonvolatile memory 110 by the system condition reception unit 171 as a judgement reference of the lifetime measure. Specifically, in the case of the memory card ID code representing the WOM-type memory card, it is judged that a reliability measure by the swap processing is unnecessary. In a case of a memory card ID code value representing the RAM-type memory card, the procedure returns to S901 without performing the lifetime measure.

In this manner, the system condition judgement unit 172 performs the swap possibility judgement based on the memory card ID code of the nonvolatile storage module 100C, that is, the type of the nonvolatile storage module. For this reason, useless swap processing need not be performed, enabling reduction of overheads of power and speed for the swap processing.

Although the address management unit 125 determines a free PB acquired by cyclically searching the physical area management table 131 as a writing destination PB in the first to third embodiments, the free PB with the smaller WC of all PB may be preferentially determined as a writing destination PB. A free PB randomly selected from all free PBs may be determined as a writing destination PB.

Although the swap processing is performed along with the writing processing performed each time the write command is received in the first to third embodiments, the present invention is not limited to this timing. For example, the swap necessity judgement result of the recording state judgement unit 126 may be held in the physical area management table 131 or the like and the memory module may search the physical area management table 131 and if necessary in the next initialization processing. Furthermore, the memory module may divide the swap processing into a first half and second half and perform the first half of the swap along with the writing processing performed each time the write command is received and may perform the second half in the initialization processing.

INDUSTRIAL APPLICABILITY

The nonvolatile storage system of the present invention employs a method of achieving both the long lifetime and high writing speed, and is useful for a still image recording and reproduction devices, moving image recording and reproduction devices and mobile phones which use the nonvolatile storage module such as the semiconductor memory card.

What is claimed is:

1. A memory controller connected to a nonvolatile memory, the memory controller reading and writing data according to an external access instruction comprising:
   an address management unit for managing at least free area of said nonvolatile memory and selecting a writing destination area from the free area of said nonvolatile memory at data writing;
   a recording state judgement unit for performing swap necessity judgement of a storage area based on a recording state of said nonvolatile memory; and
   a reading and writing control unit for controlling data reading and writing, determining a swap target area according to a judgement result of said recording state judgement unit and performing swap processing,
   wherein
   said memory controller further includes:
   a system condition reception unit for receiving a system condition designated from outside: and
   a system condition judgement unit for performing swap possibility judgement of a storage area based on said system condition, and
   said reading and writing control unit controls data reading and writing and performs determination of a swap target area and swap processing according to judgement results of said recording state judgement unit and said system condition judgement unit.

2. The memory controller according to claim 1,
   wherein
   said system condition is at least one of a requirement relating to access speed, requirement relating to power, and requirement relating to lifetime measure.

3. The memory controller according to claim 1,
   wherein
   said system condition judgement unit determines a number of swap based on said system condition.

4. The memory controller according to claim 1,
   wherein
   said system conditions reception unit receives information on a type of said nonvolatile memory, and
   said system condition judgement unit performs swap possibility judgement according to the type of the said nonvolatile memory.

5. The memory controller according to claim 1,
   wherein
   said system condition reception unit receives information on a type of said nonvolatile storage module mounting the memory controller thereon, and
   said system condition judgement unit judges possibility of swap according to the type of said nonvolatile storage module.

6. A nonvolatile storage module for reading and writing data according to an external access instruction comprising:
   a nonvolatile memory; and
   a memory controller connected to said nonvolatile memory for reading and writing data according to the external access instruction, wherein:
   said memory controller includes:
   an address management unit for managing at least free area of said nonvolatile memory and selecting a writing destination area from the free area of said nonvolatile memory at data writing;
   a recording state judgement unit for performing swap necessity judgement of a storage area based on a recording state of said nonvolatile memory; and
   a reading and writing control unit for controlling data reading and writing, determining a swap target area according to judgement result of said recording state judgement unit and performing swap processing,
   wherein
   said memory controller further includes:
   a lifetime judgement unit for judging a lifetime relating to a data retention time of data stored in said nonvolatile memory and informing lifetime information to the outside;
   a system condition reception unit for receiving a system condition designated from the outside; and
   a system condition judgement unit for performing swap possibility judgement of a storage area based on said system condition, and said reading and writing control unit controls data reading and writing and performs determination of a swap target area and swap processing according to judgement results of said recording state judgement unit and said system condition judgement unit.

7. The nonvolatile storage module according to claim 6, wherein said system condition reception unit receives information on a type of said nonvolatile memory, and said system condition judgement unit performs swap possibility judgement according to the type of said nonvolatile memory.

8. The nonvolatile storage module according to claim 6, wherein said system condition reception unit receives information on the type of said nonvolatile storage module mounting said memory controller thereon, and said system condition judgement unit performs swap possibility judgement according the type of said nonvolatile storage module.

9. An access module connected to the nonvolatile storage module according to claim 6, the access module writing data to said nonvolatile storage module and reading data from said nonvolatile storage module comprising:

a system condition informing unit for informing said system condition to said nonvolatile storage module.

10. A nonvolatile storage system comprising:

an access module; and a nonvolatile storage module for reading and writing data according to an access instruction from said access module, wherein said nonvolatile storage module includes:

a nonvolatile memory; and a memory controller connected to said nonvolatile memory, the memory controller reading and writing data according to an external access instruction, said memory controller includes:

an address management unit for managing at least free area of said nonvolatile memory and selecting a writing destination area from the free area of said nonvolatile memory at data writing;

a recording state judgement unit for performing swap necessity judgement of a storage area based on a recording state of said nonvolatile memory; and a reading and writing control unit for controlling data reading and writing, and determining a swap target area according to a judgement result of said recording state judgement unit and performing swap processing, wherein said memory controller further includes:

a system condition reception unit for receiving a system condition designated from said access module: and a system condition judgement unit for performing swap possibility judgement of a storage area based on said system condition; and said reading and writing control unit controls data reading and writing and performs determination of a swap target area and swap processing according to judgement results of said recording state judgement unit and said system condition judgement unit.

11. The nonvolatile storage system according to claim 10, wherein said system condition is at least one of a requirement relating to access speed, requirement relating to power, and requirement relating to lifetime measure.

12. The nonvolatile storage system according to claim 10, wherein said system condition judgement unit determines a number of swap based on said system condition.

13. The nonvolatile storage system according to claim 10, wherein said system condition reception unit receives information on a type of said nonvolatile memory, and said system condition judgement unit performs swap possibility judgement according the type of said nonvolatile memory.

14. The nonvolatile storage system according to claim 10, wherein said system condition reception unit receives information on the type of said nonvolatile storage module mounting said memory controller thereon, and said system condition judgement unit performs swap possibility judgement according to the type of said nonvolatile storage module mounting the memory controller thereon.

* * * * *